(12) United States Patent
Terefe

(10) Patent No.: US 12,244,788 B1
(45) Date of Patent: Mar. 4, 2025

(54) TECHNIQUES FOR IDENTIFYING VEHICLE SENSOR DEGRADATION

(71) Applicant: Zoox, Inc., Foster City, CA (US)

(72) Inventor: Nehemia Girma Terefe, Santa Barbara, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/333,706

(22) Filed: May 28, 2021

(51) Int. Cl.
*H04N 17/00* (2006.01)
*G01N 21/55* (2014.01)

(52) U.S. Cl.
CPC ........... *H04N 17/002* (2013.01); *G01N 21/55* (2013.01); *G01N 2201/062* (2013.01)

(58) Field of Classification Search
CPC ........ G03B 17/18; G03B 17/02; G03B 17/12; G03B 30/00; G03B 15/00; G03B 19/00; G03B 2215/00; G03B 2217/00; G03B 2217/002; G03B 2217/18; G03B 2219/00; G03B 21/147; G01S 2007/4975; G01S 2007/4977; G02B 27/0006; B60S 1/0818; B60S 1/0822; B60S 1/0833; B60S 1/0837; B60S 1/0844; B60S 1/0862; B60S 1/0892; G01N 21/94; G01N 21/55; G01N 2201/062; G01N 21/05; H04N 23/811; H04N 17/002; H04N 23/51; H04N 23/55; H04N 23/57;
(Continued)

(56) References Cited

U.S. PATENT DOCUMENTS

| 1,115,575 | A  | * | 11/1914 | Roba ......................... A63H 1/06 446/241 |
| 11,068,726 | B1 | * | 7/2021 | Silver ...................... G01S 13/04 |
| 11,115,575 | B2 | * | 9/2021 | Polak ................... H04N 5/2251 |

(Continued)

FOREIGN PATENT DOCUMENTS

| EP | 3091342 A1 | 9/2016 | |
| EP | 3367660 A1 * | 8/2018 | ........... G01S 17/894 |

(Continued)

OTHER PUBLICATIONS

U.S. Appl. No. 16/011,335, filed Jun. 18, 2018, McMichael, et al., "Sensor Obstruction Detection and Mitigation Using Vibration and/or Heat", 80 pages.

(Continued)

*Primary Examiner* — John W Miller
*Assistant Examiner* — Humam M Satti
(74) *Attorney, Agent, or Firm* — Lee & Hayes, P.C.

(57) ABSTRACT

Techniques for identifying when a sensor of a vehicle is obstructed. For instance, the sensor may include a light source (e.g., a light-emitting diode), a main sensor, a lens, a window, and/or a light sensor. The light source of the sensor may emit light, where the main sensor and/or the light sensor generate sensor data representing at least a portion of the light that is reflected. The vehicle may then determine a characteristic associated with the at least the portion of the light, such as an area of illumination or an intensity of the at least the portion of the light. Next, the vehicle may compare the characteristic to a threshold in order to determine whether the characteristic satisfies the threshold. Based on the determination, the vehicle may determine whether the sensor is obstructed, such as by a substance being located on the lens and/or the window.

19 Claims, 11 Drawing Sheets

(58) Field of Classification Search
CPC ........ H04N 23/54; H04N 23/56; H04N 23/50; H04N 23/52; H04N 23/60; H04N 23/81
See application file for complete search history.

(56) References Cited

U.S. PATENT DOCUMENTS

| | | | |
|---|---|---|---|
| 2003/0193604 A1* | 10/2003 | Robins | G02B 27/0006 348/335 |
| 2008/0088702 A1* | 4/2008 | Linsenmaier | H04N 23/811 348/119 |
| 2019/0250259 A1* | 8/2019 | Frieventh Cienfuegos | G01S 7/4811 |
| 2019/0391075 A1* | 12/2019 | Herrero | G02B 27/0006 |
| 2020/0166649 A1 | 5/2020 | Terefe | |
| 2020/0174156 A1 | 6/2020 | Terefe | |
| 2020/0271823 A1* | 8/2020 | Herman | G01V 8/20 |
| 2021/0041542 A1* | 2/2021 | Shepard | G01S 17/89 |
| 2022/0120911 A1* | 4/2022 | Gilbergs | G01S 17/42 |

FOREIGN PATENT DOCUMENTS

| | | | | |
|---|---|---|---|---|
| JP | H0716795 B2 * | 3/1995 | | B23K 26/06 |
| WO | WO-9427262 A1 * | 11/1994 | | B60S 1/0818 |
| WO | WO-2021079911 A1 * | 4/2021 | | B60S 1/46 |

OTHER PUBLICATIONS

U.S. Appl. No. 16/728,532, filed Dec. 27, 2019, Tariq, et al., "Sensor Degradation Detection and Remediation", 66 pages.
U.S. Appl. No. 16/864,146, filed Apr. 30, 2020, Adams, et al. "Sensor Pod Cleaning System", 69 pages.

* cited by examiner

TECHNIQUES FOR IDENTIFYING VEHICLE SENSOR DEGRADATION

BACKGROUND

Data captured by vehicle sensors within an environment can be used to assist in vehicle navigation and obstacle avoidance as the vehicle moves through the environment. For example, cameras, lidars, and other vehicle sensors may collect sensor data that vehicles may analyze and use in real-time for navigation, obstacle detection, and avoidance of roadway obstruction. However, the quality of the sensor data collected by the vehicle sensors may become degraded in certain circumstances, such as when the vehicle sensors are obstructed by dirt, snow, water, and/or other substances. In such cases, the sensor data collected by the vehicle sensors may be suboptimal or even unsuitable for use. This may potentially impact vehicle navigation, obstacle detection, object avoidance, and other vehicle functions that rely on the sensor data.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
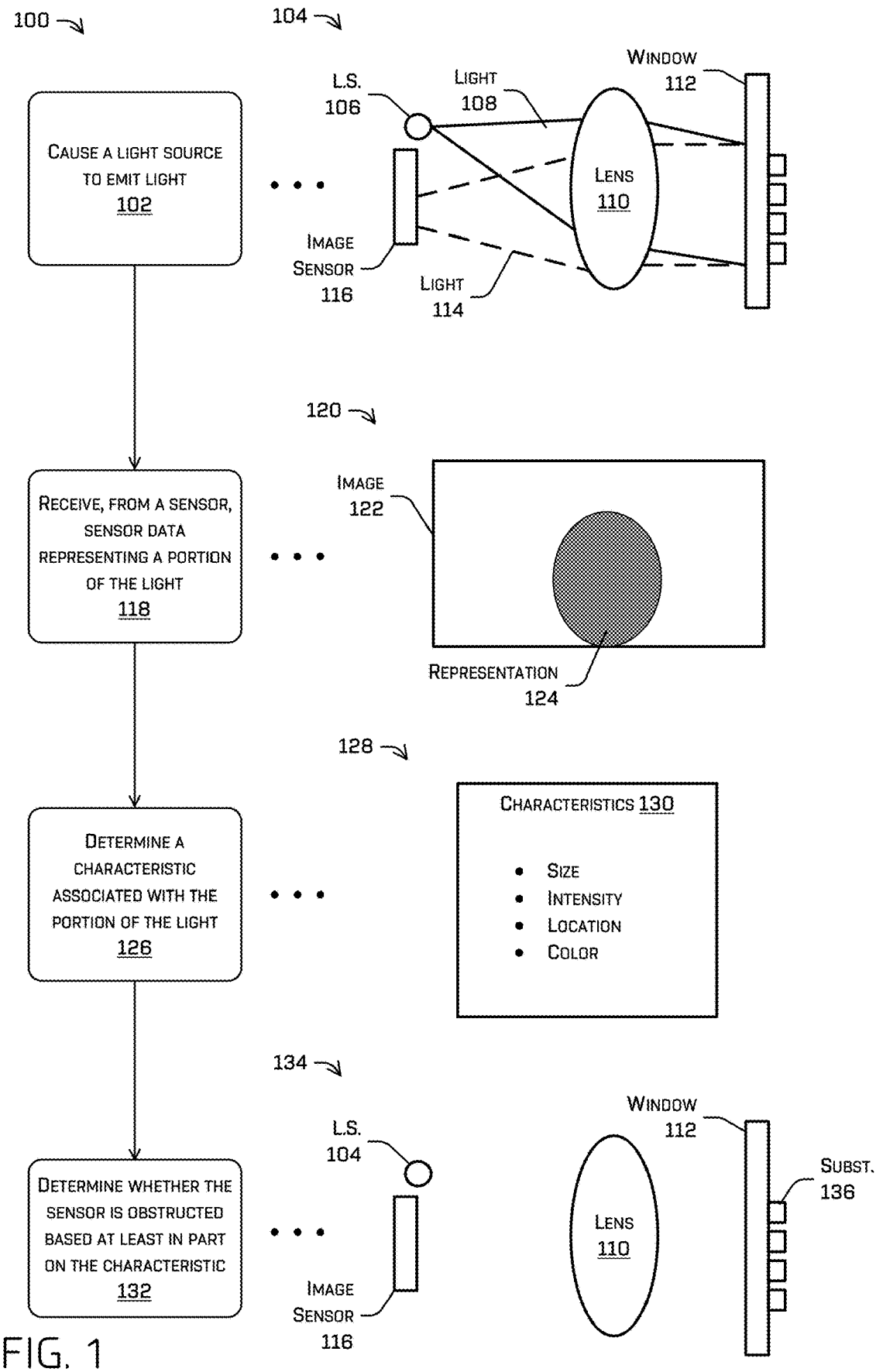
FIG. 1 is a pictorial flow diagram of an example process for determining whether a vehicle sensor is obstructed.

As discussed above, sensor data captured by sensors on a vehicle can be used to assist in vehicle navigation, object detection, and object avoidance as the vehicle navigates through an environment. However, the quality of the sensor data collected by the sensors may become degraded in certain circumstances, including based on environment factors, such as weather conditions (e.g., dirt, rain, snow, etc.). In such cases, the sensor data collected by the sensors may be suboptimal or even unsuitable for use. This may potentially impact the vehicle navigation, obstacle detection, object avoidance, and/or other vehicle functions that rely on the sensor data.

As such, the present application relates to techniques for identifying vehicle sensor degradation. For instance, and for a given sensor on the vehicle, a light source, such as a light-emitting diode (LED), may emit light. In at least some examples, such an emitter may be located internally to such a device to cause internal reflections from various optical components of the device itself. At least a portion of the light may reflect off a surface of the sensor, such as a lens or a window, and then be captured by a component of the sensor, such as an image sensor or a light sensor. In circumstances when the sensor is obstructed, a greater portion of the light may be reflected and then captured by the component of the sensor. As such, the vehicle may be configured to analyze sensor data generated by the sensor in order to determine a characteristic of the at least the portion of the light. The vehicle may then determine whether the sensor is obstructed using the characteristic. If the vehicle determines that the sensor is obstructed, the vehicle may perform one or more actions, such as coming to a safe stop, cleaning the sensor, or reducing a confidence attributed to the sensor, for example. For example, the sensor may include a camera, a lidar sensor, a radar sensor, a sonar sensor, and/or any other type of sensor. In some examples, the sensor may include a separate light source, such as a LED, located within a housing of the sensor. The light source may be separate from and in addition to light sources typically included in sensors of the respective type (e.g., separate and additional to laser emitters in a lidar sensor, or separate and additional to light emitters of a time of flight camera, etc.). In at least some examples, such a light source may be selected based on the optical component under test (e.g., a light emitter may have a wavelength selected to optimally reflect from one or more optical components (such as lenses or filters) while being within a range of wavelengths by the corresponding detector). For example, the light source may be located on a printed circuit board, on a side wall, proximate to a baffle, and/or at any other location within the housing of the sensor. The light source may include a visible light source and/or an infrared light source. Additionally, in some examples, the sensor may also include a separate light sensor, such as a photodiode, located within the housing of the sensor. The light sensor may also be located on the printed circuit board, on the side wall, proximate to the baffle, and/or at any other location within the housing of the sensor. In such examples, the photoemitter/detector pair may be optimized for wavelengths which don't interfere with the wavelengths of the device while being selected in the reflective portion of the spectrum of the optical component under test.

The vehicle may be configured to cause the light source to emit light. In some examples, the vehicle causes the light source to emit light at specific time periods, such that the light source does not interfere with normal operation of the sensor. For example, when the sensor includes a camera, the vehicle may generate image data using the camera and then analyze the image data in order for vehicle navigation, object detection, object avoidance, and/or to perform additional actions described herein. When generating the image data, the vehicle may generate image data representing a frame (referred to, in some examples, as a "normal frame") at given time intervals, such as every 10 milliseconds, 25 milliseconds, 50 milliseconds, 100 milliseconds, and/or any other period of time. As such, the vehicle may cause the light source to emit the light at times when the camera is not capturing these normal frames such that these normal frames do not depict the light.

At least a portion of the light (referred to, in some examples, as "reflected light") emitted by the light source may then reflect off the surface (e.g., the lens, the window, etc.) of the sensor and be captured by the component (e.g., the image sensor, the lidar sensor, the light sensor, etc.) of the sensor. In some examples, the greater the amount of obstruction that is located on the surface of the sensor, the greater the amount of the light that may be reflected back to the component (e.g., the obstruction also reflects portion(s) of the light). The vehicle may then analyze sensor data generated by the sensor (e.g., by the component), where the sensor data represents the reflected light, in order to determine a characteristic of the reflected light as represented by the sensor data. As described herein, the characteristic may include, but is not limited to, an area of illumination of the reflected light, an intensity of the reflected light, a location of the reflected light, a color of the reflected light, light area intensity distribution, a distribution of the reflected light, and/or any other light characteristic. The vehicle may then determine whether the sensor is obstructed based at least in part on the characteristic.

For example, the vehicle may compare the characteristic to a threshold characteristic in order to determine whether the sensor is obstructed. As described herein, the threshold characteristic may include, but is not limited to, a threshold area, a threshold intensity, a threshold location, a threshold color (e.g., frequency of the reflected light), and/or any other threshold. The vehicle may then determine that the sensor is obstructed when the characteristic satisfies the threshold and determine that the sensor is not obstructed when the characteristic does not satisfy the threshold. In some examples, and described in more detail below, the vehicle may determine that the characteristic satisfies the threshold when the characteristic is equal to or greater than the threshold and determine that the characteristic does not satisfy the threshold when the characteristic is less than the threshold. In other examples, and as also described in more detail below, the vehicle may determine that the characteristic satisfies the threshold when the characteristic is less than the threshold and determine that the characteristic does not satisfy the threshold when the characteristic is equal to or greater than the threshold.

In some examples, all the vehicles may use the same threshold(s) for determining whether sensors are obstructed. Additionally, or alternatively, in some examples, the vehicle determines the threshold(s) based on a previous test of the sensor. For example, such as during an initial test when the sensor is not obstructed, the vehicle may perform the processes described above in order to determine an initial characteristic for light emitted by the light source. The vehicle may then use the initial characteristic in order to determine the threshold. In some examples, the vehicle may determine that the threshold includes the initial characteristic. For example, if the initial characteristic includes an intensity of 100 lumens, then the intensity threshold may also include 100 lumens. In some examples, the vehicle may determine that the threshold includes the initial characteristic multiplied by a factor (e.g., 0.5, 2, 5, etc.). For example, and again if the initial characteristic includes an intensity of 100 lumens, then the intensity threshold may include 100 lumens multiplied by a factor of 2, which is 200 lumens. In various examples (such as those in which images are used), a baseline reflection may be captured prior to utilization of the device and/or over time. An aggregate intensity of the baseline image or a per pixel comparison of the baseline image and newly captured images may be utilized to determine the initial characteristic. In additional or alternative examples, a machine learned model may be trained based on a collection of sensor data and corresponding obstructions such that newly acquired sensor data may be input into the model to determine the presence of an obstruction and/or the characteristic.

In some examples, the vehicle may determine a level of the obstruction using at least the characteristic. For example, the vehicle may determine that there is a first level of obstruction when the characteristic is within a first range (e.g., a first range of areas, a first range of intensities, etc.), a second level of obstruction when the characteristic is within a second range (e.g., a second range of areas, a second range of intensities, etc.), a third level of obstruction when the characteristic is within a third range (e.g., a third range of areas, a third range of intensities, etc.), and/or so forth. The level of obstruction may indicate the size of the obstruction, the portion (e.g., percentage) of the lens or window that is obstructed, a degree of obstruction (e.g., a transparency or opacity of the obstruction), or the like. In such an example, and as described in more detail below, the vehicle may perform different actions based on the level of the obstruction.

Additionally, or alternatively, in some examples, the vehicle may determine the type of obstruction using at least the characteristic. For example, the vehicle may determine that the type of obstruction includes a first substance (e.g., snow) when the characteristic is within a first range (e.g., a first range of intensities), a second substance (e.g., water) when the characteristic is within a second range (e.g., a second range of intensities), a third substance (e.g., mud) when the characteristic is within a third range (e.g., a third range of intensities), and/or so forth. Again, in such an example, and as described in more detail below, the vehicle may perform different actions based on the type of obstruction.

For instance, the vehicle may perform one or more actions based on whether the sensor is obstructed, the level of obstruction, and/or the type of obstruction. For a first example, such as when the vehicle determines that the sensor is not obstructed, the vehicle may perform one or more first actions. The one or more first actions may include, but are not limited to, continuing to operate, generating data representing the results of the test (e.g., the characteristic(s)), and/or the like. For a second example, such as when the vehicle determines that the sensor is obstructed, the vehicle may perform one or more second actions. The one or more second actions may include, but are not limited to, continuing to operate (e.g., if one or more other sensors adequately cover the field of view of the obstructed sensor), reducing a confidence attributed to the sensor, safely stopping, slowing down, retesting the sensor to determine whether the sensor remains obstructed, generating data representing the results of the test, initiating a cleaning operation to clean the sensor, and/or the like. Additionally, in some examples, the one or more second actions may be based on the level of obstruction and/or the type of obstruction.

For a first example, the vehicle may determine to continue to operate when the level of obstruction includes a first level of obstruction, but determine to safely stop when the level of obstruction includes at least a second level of obstruction. In such an example, the vehicle may determine to continue operating since the sensor may still operate as intended even when the obstruction includes the first level of obstruction, but determine to safely stop since the sensor may not operate as intended when the obstruction includes the second level of obstruction. For a second example, the vehicle may determine to continue to operate when the type of obstruction includes a first substance, such as water, but determine to safely stop when the type of obstruction includes a second substance, such as mud. In such an example, the vehicle may determine to continue operating since the water will likely be cleared from obstructing the sensor and determine to safely stop since the mud will likely continue obstructing the sensor. Techniques for clearing the obstruction may be found, for example, in U.S. patent application Ser. No. 16/011,335 titled "Sensor Obstruction Detection and Mitigation using Vibration and/or Heat" and filed Jun. 18, 2018, U.S. patent application Ser. No. 16/728,532, titled "Sensor Degradation Detection and Remediation" and filed Dec. 27, 2019, and U.S. patent application Ser. No. 16/864,146, titled "Sensor Pod Cleaning System" and filed Apr. 30, 2020, which are incorporated by reference herein in their entirety.

As described herein, in some examples, the sensor may include a light source that emits visible light. The sensor may include such a light source when component(s) of the sensor, which the light is transmitted through (e.g., the lens), include a filter for filtering out light that is outside of the visible light spectrum. Additionally, in other examples, the sensor may include a light source that emits infrared light. The sensor may include such a light source when the component(s) of the sensor, which the light is again transmitted through, do not include such a filter. Additionally, when using the light source that emits the infrared light, the vehicle may be configured to test the sensor, using the processes described herein, even during periods of time at which the sensor is being used for normal operation. This is because the infrared light may not interfere with the normal operation of the sensor.

The techniques described herein may be implemented in a number of ways. Example implementations are provided below with reference to the following figures. Although discussed in the context of an autonomous vehicle, the methods, apparatuses, and systems described herein may be applied to a variety of systems (e.g., a sensor system or a robotic platform), and are not limited to autonomous vehicles. In another example, the techniques may be utilized in an aviation or nautical context, or in any system evaluating distances between reference points in an environment (e.g., in a system using route-relative planning). Additionally, the techniques described herein may be used with real data (e.g., captured using sensor(s)), simulated data (e.g., generated by a simulator), or any combination of the two.

FIG. 1 is a pictorial flow diagram of an example process 100 for determining whether a vehicle sensor is obstructed. At operation 102, the process 100 may include causing a light source to emit light. For instance, an example 104 illustrates a light source 106 emitting light 108 through a lens 110 and towards a window 112 of the sensor. At least a portion of the light 114 (e.g., reflected light) may then reflect off of the window 112 and pass back through the lens 110 to an image sensor 116. Additionally, an additional portion of the light may pass through the window 112 to an outer environment. In the example of FIG. 1, the sensor may include the light source 106, the lens 110, the window 112, and the image sensor 116. However, in other examples, and as also illustrated in FIGS. 2-7, the sensor may include one or more additional and/or alternative components than those illustrated in the example of FIG. 1.

At operation 118, the process 100 may include receiving, from a sensor, sensor data representing a portion of the light. For instance, an example 120 illustrates sensor data representing the portion of the light 114 that is reflected off of the window 112 and back towards the image sensor 116. In the example of FIG. 1, the sensor includes the image sensor 116 and the sensor data includes image data representing an image 122, where the image 122 depicts the portion of the light 114 that is captured by the image sensor 116 as representation 124. However, in other examples, the sensor data may include additional and/or alternative types of sensor data. For example, the sensor data may include lidar data generated by a lidar sensor, light-intensity data generated by a light sensor (e.g., a photodiode), and/or any other type of sensor data that may represent the portion of the light 114.

At operation 126, the process 100 may include determining a characteristic associated with the portion of the light. For instance, an example 128 illustrates that the vehicle may analyze the sensor data in order to determine characteristics(s) 130 associated with the representation 124 of the portion of the light 114. In the example of FIG. 1, the characteristic(s) 130 include the area of illumination, the intensity, the location, the distribution, and/or the color. However, in other examples, the vehicle may determine additional and/or alternative characteristics associated with the representation 124 of the portion of the light 114. The vehicle may then generate data that represents the characteristic(s) 130, a time that test was performed to determine the characteristic(s) 130, an identity of the sensor being tested, and/or any other additional information associated with the testing of the sensor.

At operation 132, the process 100 may include determining whether the sensor is obstructed based at least in part on the characteristic. For instance, an example 134 illustrates the vehicle determining that the sensor is obstructed by a substance 136 located on the window 112 of the sensor. In some examples, the vehicle determines that the sensor is obstructed by comparing the characteristic to a threshold. For example, the vehicle may compare the area of illumination to a threshold area, the intensity to a threshold intensity, the location to a threshold location, and/or the color to a threshold color. The vehicle may then determine that the sensor is obstructed based on the characteristic satisfying the threshold.

As described herein, in some examples, the vehicle may determine that the characteristic satisfies the threshold based on the characteristic being equal to or greater than the threshold. For a first example, and in the example of FIG. 1, the vehicle may determine that the area of illumination satisfies the threshold area based on the area of illumination being equal to or greater than the threshold area. For a second example, and also in the example of FIG. 1, the vehicle may determine that the intensity satisfies the threshold intensity based on the intensity being equal to or greater than the threshold intensity.

However, in other examples, the vehicle may use additional and/or alternative techniques to determine that the characteristic satisfies the threshold. For a first example, the vehicle may determine that the location satisfies the threshold location when the location is outside of a predetermined range of locations. For a second example, the vehicle may determine that the color satisfies the threshold color when the color is outside of a color range. Additionally, in some examples, the vehicle may use the characteristic 130 to determine the level of obstruction associated with the sensor and/or the type of substance 136 that is obstructing the sensor, using one or more of the processes described herein. The vehicle may then perform one or more actions based on determining that the sensor is obstructed by the substance 136.

Figure 2:
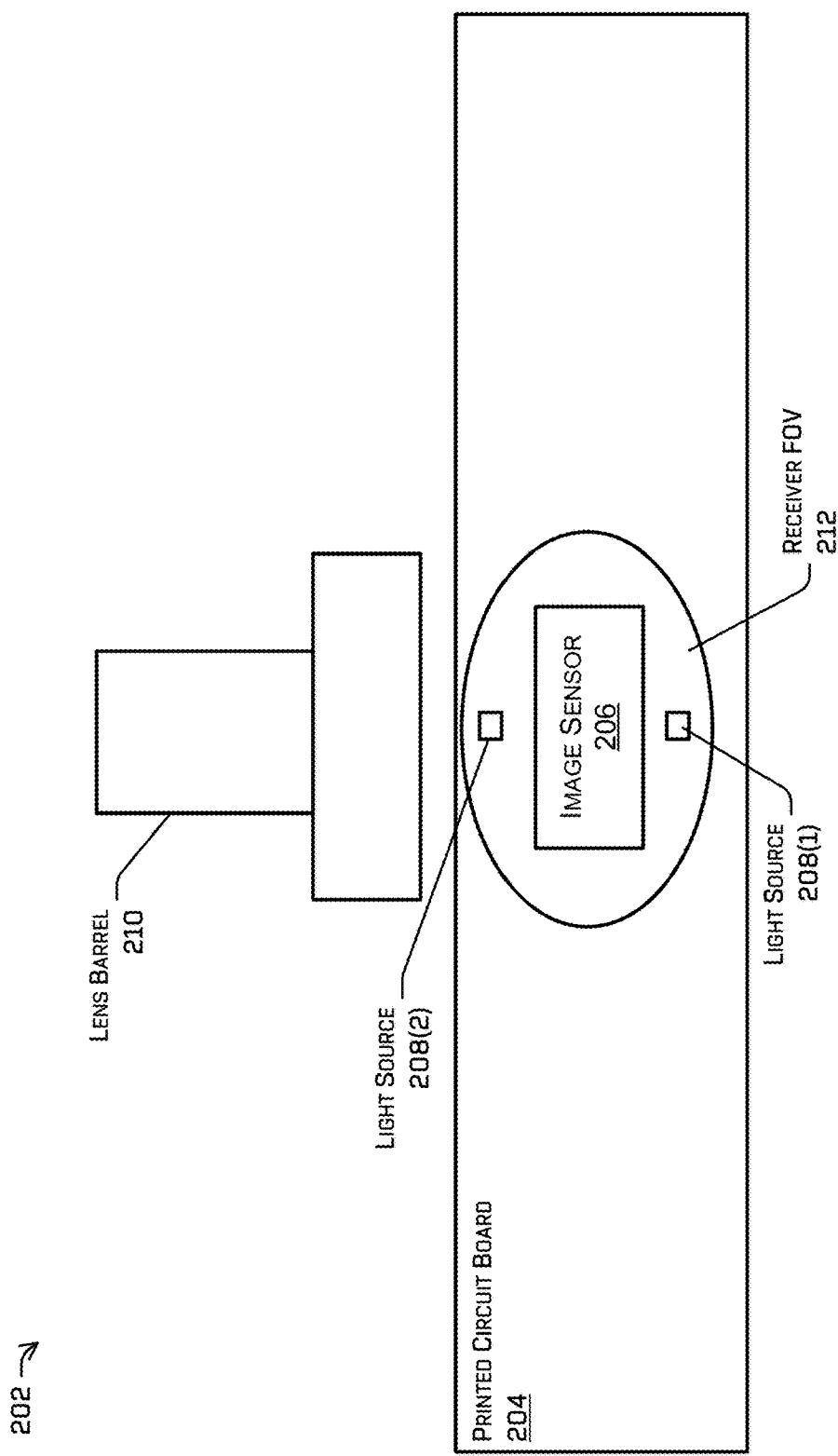
FIG. 2 illustrates a first example of a sensor that includes components for detecting obstructions.

FIG. 2 illustrates a first example of a sensor 202 that includes components for detecting obstructions. As shown, the sensor 202 includes at least a printed circuit board 204, an image sensor 206 (also referred to as a "main sensor") disposed on the printed circuit board 204, light sources 208(1)-(2) (also referred to as "light sources 208") disposed on the printed circuit board 204, and a lens barrel 210 that includes at least one lens. In the example of FIG. 2, the light sources 208 are located on either side of the image sensor 206 on the printed circuit board such that the light sources 208 do not interfere with the image sensor 206. Additionally, the light sources 208 are located within a receiver field of view (FOV) 212 of the sensor 202. This may be so the light that is emitted by the light sources 208 is able to travel through the lens barrel 210 and to the lens of the sensor 202, which is discussed in more detail below.

Figure 3:
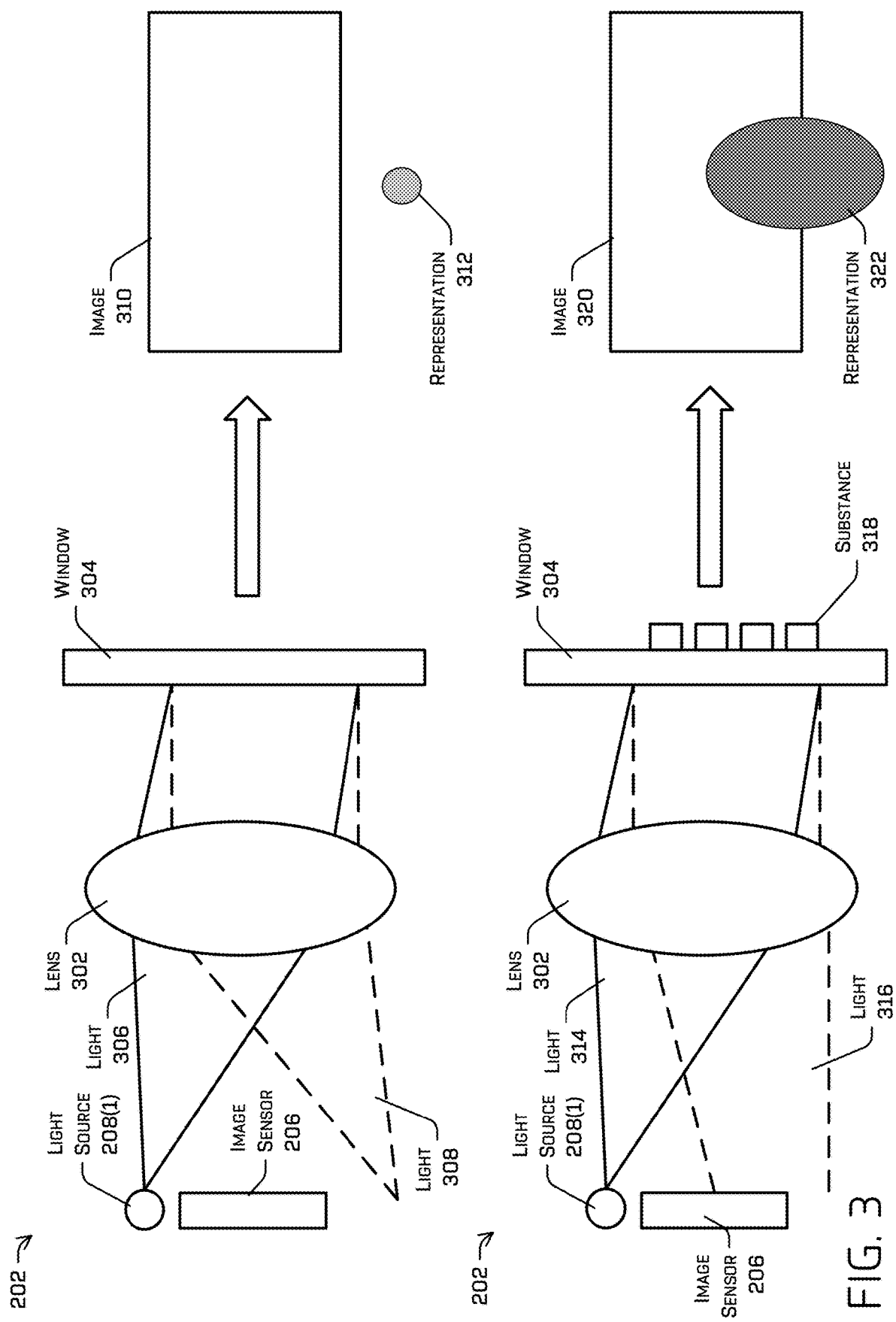
FIG. 3 illustrates an example of using the components of the sensor of FIG. 2 in order to detect an obstruction.

For example, FIG. 3 illustrates an example of using the components of the sensor 202 in order to detect an obstruction. As shown, the sensor 202 includes a lens 302 and a window 304. In some examples, the lens 302 is located within the lens barrel 210 of the sensor 202 and the window 304 is located outside of the lens barrel 210.

In the example of FIG. 3, and at a first time illustrated by the top illustration of the sensor 202, the vehicle may perform a first test by causing the light source 208(1) to emit light 306, which is shown by the solid lines. The light 306 may travel through the lens 302 of the sensor 202 and to the window 304. At least a portion of the light 308 may reflect off of the window 304, which is shown by the dashed lines, while the rest of the light 306 travels through the window 304 and to the surrounding environment for which the vehicle is located. The light 308 that is reflected off of the window 304 will then travel back through the lens 302 and to a side of the image sensor 206 of the sensor 202. As such, the sensor 202 may generate first sensor data, where the first sensor data does not represent the light 308 that is reflected off of the window 304. In the example of FIG. 3, the first sensor data may include first image data representing a first image 310.

In the example of FIG. 3, the vehicle may then determine that the sensor is not obstructed based on the first sensor data not representing the representation 312 of the light 308. Additionally, or alternatively, in the example of FIG. 3, the vehicle may determine that the sensor is not obstructed based on the first test being an initial test where the lens is clean from any obstruction.

While the example of FIG. 3 illustrates the light 308 missing the image sensor 206, in other examples, the light 308 may reflect back and be captured by the image sensor 206. In such examples, the vehicle may analyze the sensor data generated by the image sensor 206 in order to determine first characteristic(s) associated with the light 308. For example, the vehicle may determine a first area of illumination (e.g., a size of the representation 312), a first intensity, a first color, a first location, and/or a first distribution of the light 308 as represented by the sensor data. In such examples, the vehicle may use the first characteristic(s) from the first test in order to determine threshold(s) for additional tests that are performed on the sensor 202.

Next, and at a second time illustrated by the bottom illustration of the sensor 202, the vehicle may perform a second test by causing the light source 208(1) to again emit light 314, which is shown by the solid lines. The light 314 may again travel through the lens 302 of the sensor 202 and to the window 304. At least a portion of the light 316 may reflect off of the window 304 and/or a substance 318 located on the window 304, which is shown by the dashed lines, while the rest of the light 314 travels through the window 304 and to the surrounding environment for which the vehicle is located. The light 316 that is reflected off of the window 304 will then travel back through the lens 302, where at least a portion of the light 316 reflects back to the image sensor 206 of the sensor 202. As such, the sensor 202 may generate second sensor data that represents the light 316 that is reflected off of the window 304 and/or the substance 318. In the example of FIG. 3, the second sensor data may include second image data representing a second image 320, where the second image 320 depicts a portion of a representation 322 of the light 316. In the example of FIG. 3, the vehicle may then determine that the sensor is now obstructed based on the second sensor data representing the portion of the representation 322 of the light 308.

Additionally, in some examples, the vehicle may analyze the second sensor data in order to determine second characteristic(s) associated with the light 316. For example, the vehicle may determine a second area of illumination (e.g., a size of the representation 322), a second intensity, a second color, a second location, and/or a second distribution of the light 316 as represented by the second sensor data. In the example of FIG. 3, since there is now the substance 318 located on the surface of the window 304, more of the light 314 that is emitted during the second test of the sensor 202 may be reflected back towards the image sensor 206 than the light 306 that was emitted during the first test of the sensor 202. As such, the second characteristic(s) determined during the second test differ from the first characteristic(s) determined during the first test. Because of this, the vehicle may determine that the sensor is obstructed during the second test. As above, the characteristic may be based on a per pixel comparison of the image 310 and image 320, an aggregate of pixels of images 310 and 320 compared to one another, by inputting the images 310 and 320 into a machine learned model, or the like.

For example, the vehicle may compare the second characteristic(s) to the threshold(s) in order to determine that the sensor 202 is obstructed. In some examples, the threshold(s) used during the second test may include the first characteristic(s). For example, the vehicle may determine that the threshold area includes the first area (which, in the example of FIG. 3, may be zero since the light 308 did not reflect back to the image sensor 206), the threshold intensity includes the first intensity (which, in the example of FIG. 3, may again be zero since the light 308 did not reflect back to the image sensor 206), the threshold color includes the first color, and/or the threshold location includes the first location. Additionally, or alternatively, in some examples, the threshold(s) used during the second test may be determined based at least in part on the first characteristic(s). For example, the vehicle may determine the threshold(s), such as the threshold area and/or the threshold intensity, by multiplying the first characteristic(s) by a factor. In either of the examples, the vehicle may then determine that the sensor 202 is obstructed based on the second characteristic(s) satisfying the threshold(s).

For a first example, and in the example of FIG. 3, the vehicle may determine that the sensor 202 is obstructed based on the second area of illumination being equal to or greater than the threshold area. For a second example, the vehicle may determine that the sensor 202 is obstructed based on the second intensity being equal to or greater than the threshold intensity. In either of these examples, the vehicle may make the determination(s) since the area of illumination of the representation 322 and/or the intensity of the representation 322 are greater when the window 304 is obstructed by the substance 318.

Figure 4:
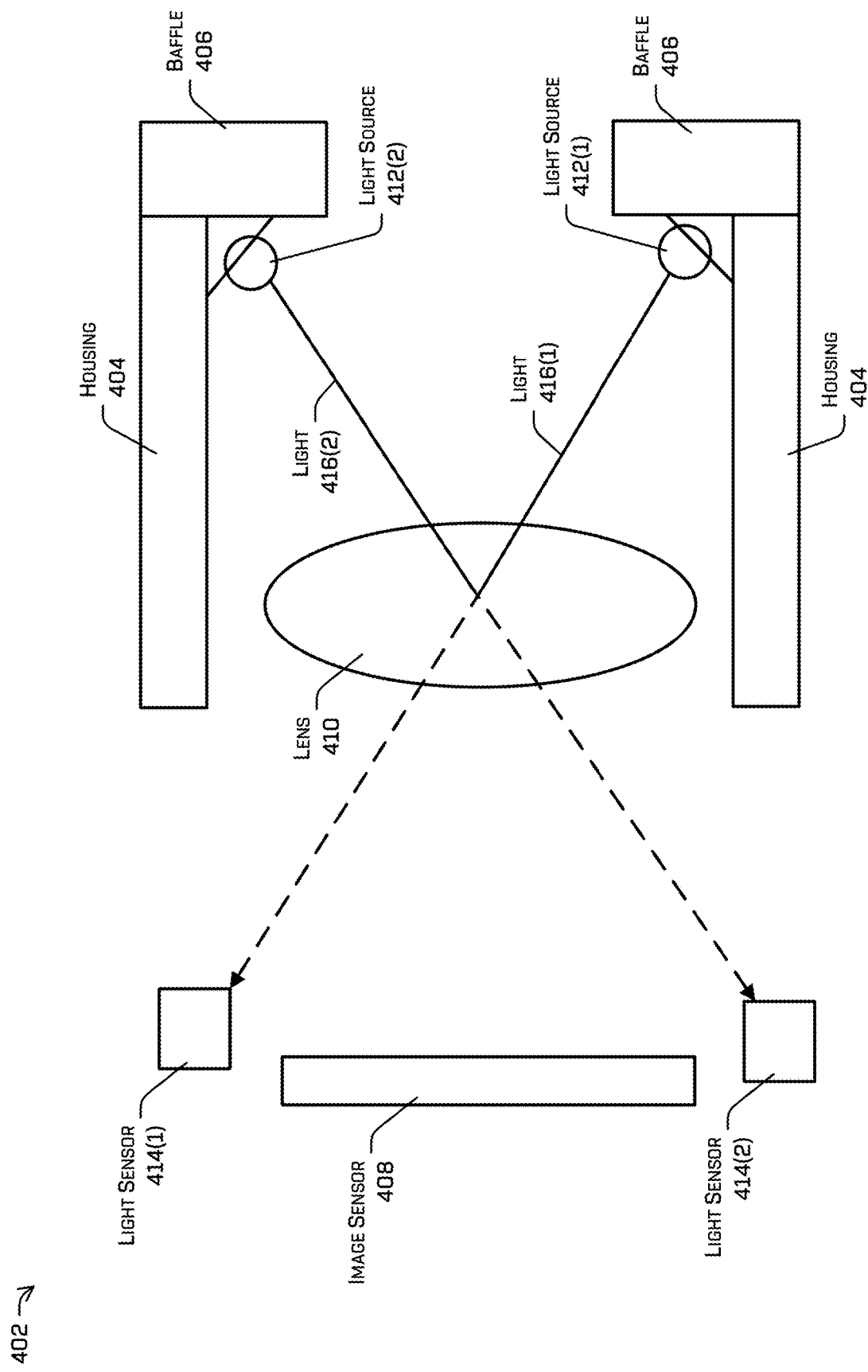
FIG. 4 illustrates a second example of a sensor that includes components for detecting obstructions.

FIG. 4 illustrates a second example of a sensor 402 that includes components for detecting obstructions. As shown, the sensor 402 includes a housing 404 with baffles 406, an image sensor 408, a lens 410, light sources 412(1)-(2) (also referred to as "light sources 412"), and light sensors 414 (1)-(2) (also referred to as "light sensors 414"). However, in other examples, the sensor 402 may include fewer and/or additional components (e.g., the sensor 402 may only include a single light source 412 and/or a single light sensor 414). In the example of FIG. 4, the sensor 402 does not include a window similar to the sensor 202. Because of this, the sensor 402 may become obstructed when substances accumulate on the lens 410 of the sensor 402.

As shown, the light sources 412 may be configured to emit light 416(1)-(2) (also referred to as "light 416"), which is represented by the sold portions of the arrows, towards the light sensors 414. At least a portion of the light 416, which is represented by the dashed portions of the arrows, then reaches the light sensors 414. Since the light 416 travels through the lens 410 (and/or any obstruction on the lens 410) to reach the light sensors 414, a greater portion of the light 416 will reach the light sensors 414 when the sensor 402 is not obstructed (e.g., when no substances are located on the lens 410) than when the sensor 402 is obstructed (e.g., when substances are located on the lens 410). This is because the obstruction will block at least a portion of the light 416 from traveling through the lens 410 and to the light sensors 414.

In the example of FIG. 4, the light sensors 414 may then generate sensor data representing an intensity of the light 416. The vehicle may then analyze the sensor data in order to determine the intensity (e.g., a characteristic of the light 416) and use the intensity to determine whether the sensor 402 is obstructed, using one or more of the processes described herein. For instance, and in the example of FIG. 4, the vehicle may determine that the sensor 402 is obstructed when the intensity is less than a threshold intensity.

As further illustrated in the example of FIG. 4, the baffles 406 may be configured to block light from the outside environment from reaching the light sensors 414. For example, the baffle 406 that is located close to the light source 412(2) may block the light from the outside environment from reaching the light sensor 414(1) and the baffle 406 that is located close to the light source 412(1) may block the light from the outside environment from reaching the light sensor 414(2). As such, the baffles 406 may help stop the light from the outside environment from interfering with the light sensors 414 and as such, interfering with determining whether the sensor 402 is obstructed.

Figure 5:
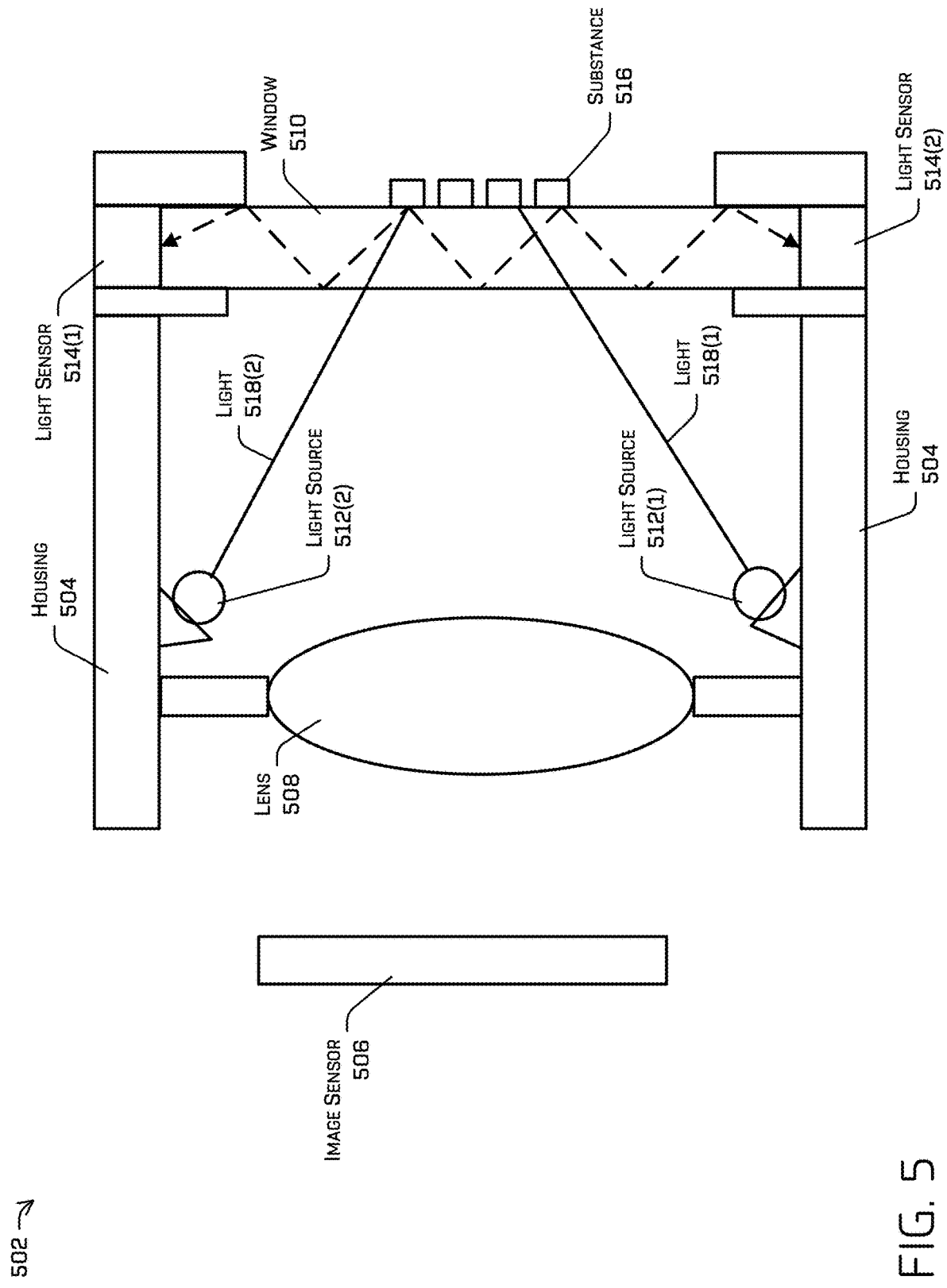
FIG. 5 illustrates a third example of a sensor that includes components for detecting obstructions.

FIG. 5 illustrates a third example of a sensor 502 that includes components for detecting obstructions. As shown, the sensor 502 includes a housing 504, an image sensor 506, a lens 508, a window 510, light sources 512(1)-(2) (also referred to as "light sources 512"), and light sensors 514 (1)-(2) (also referred to as "light sensors 514"). However, in other examples, the sensor 502 may include fewer and/or additional components (e.g., the sensor 502 may only include a single light source 512 and/or a single light sensor 514). In the example of FIG. 5, the sensor 502 may become obstructed when substances 516 accumulate on the window 510 of the sensor 502. This is because the window 510 may be configured to protect the other components of the sensor 502, such as the lens 508 and the image sensor 506, from the substances.

As shown, the light sources 512 may be configured to emit light 518(1)-(2) (also referred to as "light 518") towards the window 510, which is represented by the solid portion of the lines. At least a portion of the light 518, which is represented by the dashed portions of the arrows, then travels through the window 510 to the light sensors 514. Since the light 518 is configured to travel through the window 510 and to the surrounding environment of the sensor 502, a greater portion of the light 518 will travel through the window 510 to the outside environment when the sensor 502 is not obstructed (e.g., when no substances 516 are located on the window 510) than when the sensor 502 is obstructed (e.g., when substances 516 are located on the window 510). This is because the obstruction will block at least a portion of the light 518 from traveling through the window 510.

In the example of FIG. 5, the light sensors 514 may then generate sensor data representing an intensity of the light 518 that travels to the light sensors 514 through the edges of the window 510. The vehicle may then analyze the sensor data in order to determine the intensity (e.g., a characteristic of the light 518) and use the intensity to determine whether the sensor 502 is obstructed, using one or more of the processes described herein. For example, and in the example of FIG. 5, the vehicle may determine that the sensor 502 is obstructed when the intensity is equal to or greater than a threshold intensity. This is different than the example of FIG. 4, where the vehicle determines that the sensor 402 is obstructed when the intensity is less than a threshold intensity. This is because the light sensors 514 of the sensor 502 will capture a greater amount of the light 518 when the sensor 502 is obstructed while the light sensors 414 will capture a greater amount of the light 416 when the sensor 402 is not obstructed.

Figure 6:
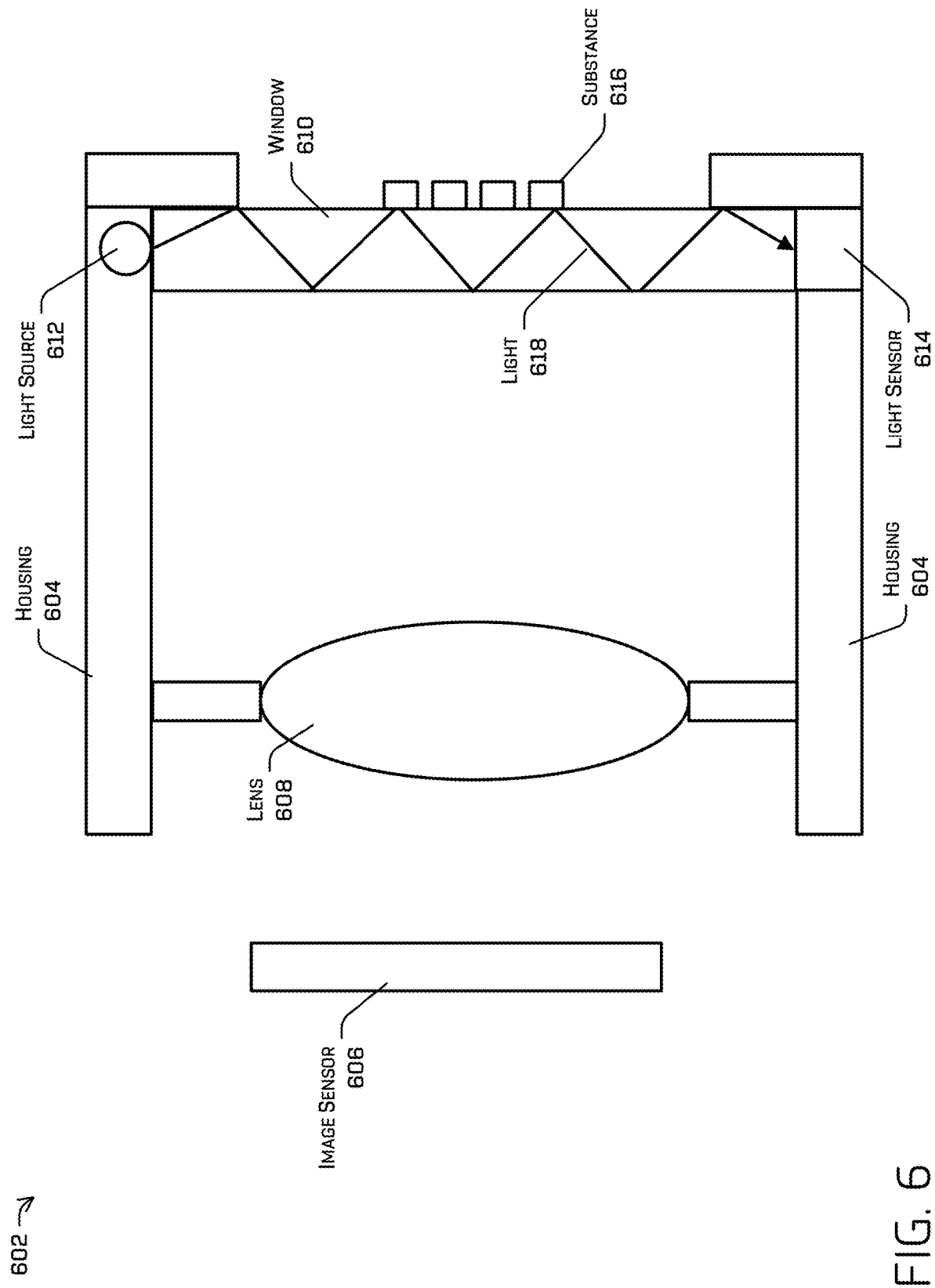
FIG. 6 illustrates a fourth example of a sensor that includes components for detecting obstructions.

FIG. 6 illustrates a fourth example of a sensor 602 that includes components for detecting obstructions. As shown, the sensor 602 includes a housing 604, an image sensor 606, a lens 608, a window 610, a light source 612, and a light sensor 614. In the example of FIG. 6, the sensor 602 may become obstructed when substances 616 accumulate on the window 610 of the sensor 602. This is because the window 610 may protect the other components of the sensor 602, such as the lens 608 and the image sensor 606, from the substances.

As shown, the light source 612 may be configured to emit light 618 at an angle and within the window 610, where at least a portion of the light 618 travels towards the light sensor 614. Although the light source 612 is emitting the light 618 towards the light sensor 614, at least some of the light 618 may travel in other directions, such as towards the lens 608 and/or through the window 610 to the surrounding environment. In the example of FIG. 6, a greater portion of the light 618 will travel to the light sensor 614 when the sensor 602 is not obstructed (e.g., when substances 616 are located on the window 610) than when the sensor 602 is obstructed (e.g., when substances 616 are not located on the window 610). This is because the obstruction will block at least the portion of the light 618 that would normally travel through the window 610 and to the light sensor 614.

In the example of FIG. 6, the light sensor 614 may then generate sensor data representing an intensity of the light 618 that travels to the light sensor 614 through the window 610. The vehicle may then analyze the sensor data in order to determine the intensity (e.g., a characteristic of the light 618) and use the intensity to determine whether the sensor 602 is obstructed, using one or more of the processes described herein. For instance, and in the example of FIG. 6, the vehicle may determine that the sensor 602 is obstructed when the intensity is less than a threshold intensity and determine that the sensor 602 is not obstructed when the intensity is equal to or greater than than the threshold intensity.

Figure 7:
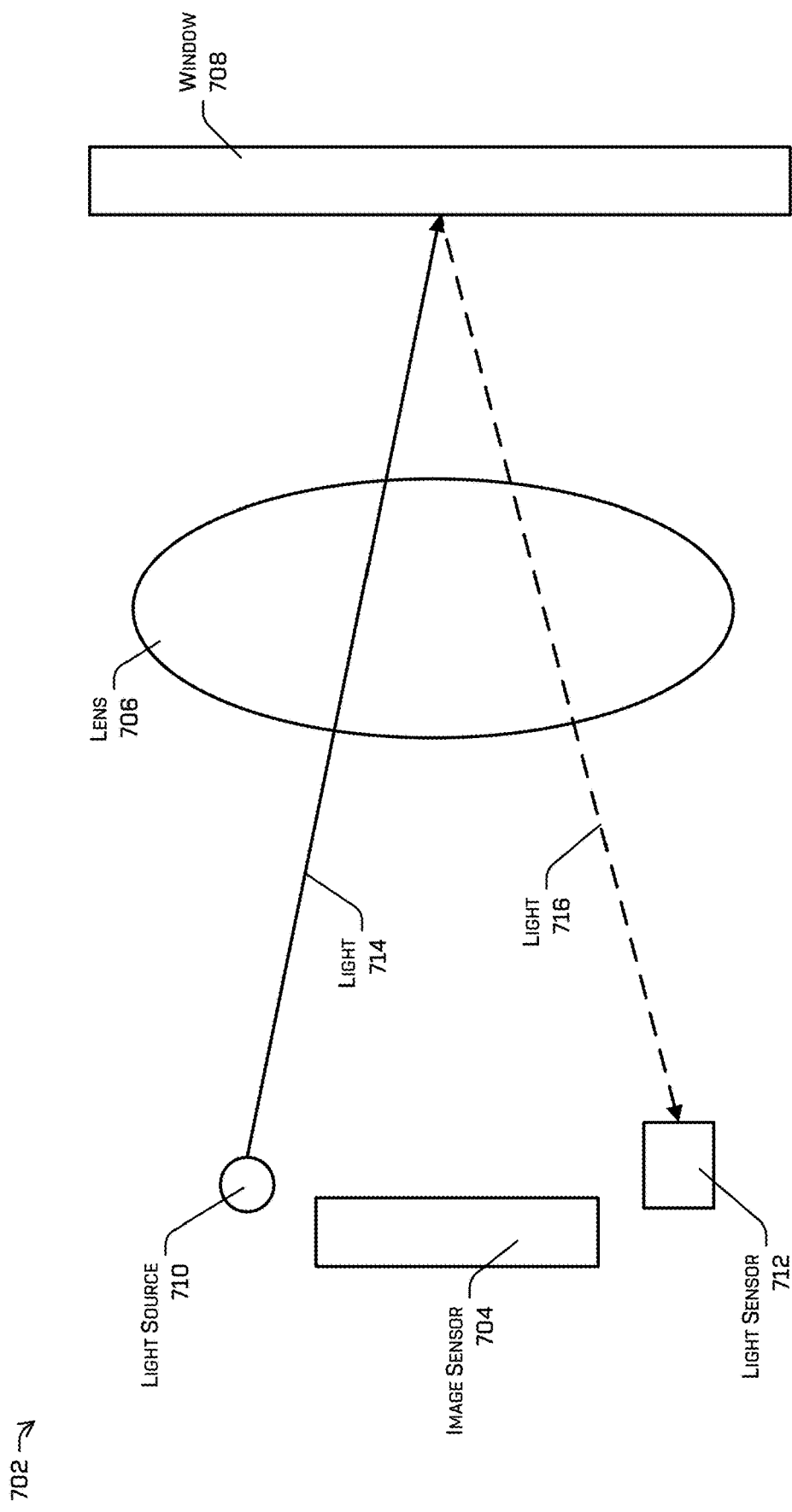
FIG. 7 illustrates a fifth example of a sensor that includes components for detecting obstructions.

FIG. 7 illustrates a fifth example of a sensor 702 that includes components for detecting obstructions. As shown, the sensor 702 includes an image sensor 704, a lens 706, a window 708, a light source 710, and a light sensor 712. However, in other examples, the sensor 702 may include additional and/or alternative components. In the example of FIG. 7, the sensor 702 may become obstructed when substances accumulate on the window 708 of the sensor 702. This is because the window 708 may protect the other components of the sensor 702, such as the lens 706 and the image sensor 704, from the substances.

As shown, and similar to the example of FIG. 3, the light source 710 may be configured to emit light 714 that is configured to travel through the lens 706 of the sensor 702 and to the window 708. At least a portion of the light 714, which is represented by light 716, may reflect off of the window 708 (and/or substances located on the window 708) while the rest of the light 714 travels through the window 708 and to the surrounding environment for which the vehicle is located. The light 716 that is reflected off of the window 708 (and/or the substances) will then travel back through the lens 706 and to the light sensor 712 of the sensor 702. As such, a greater portion of the light 714 will travel to the light sensor 712 when the sensor 702 is obstructed (e.g., when substances are located on the window 708) than when the sensor 702 is not obstructed (e.g., when substances are not located on the window 708). This is because the obstruction will block more of the light 714 from traveling through the window 708 and to the surrounding environment.

In the example of FIG. 7, the light sensor 712 may then generate sensor data representing an intensity of the light 716 that travels to the light sensor 712. The vehicle may then analyze the sensor data in order to determine the intensity (e.g., a characteristic of the light 716) and use the intensity to determine whether the sensor 702 is obstructed, using one or more of the processes described herein. For instance, and in the example of FIG. 7, the vehicle may determine that the sensor 702 is obstructed when the intensity is equal to or greater than a threshold intensity and determine that the sensor 702 is not obstructed when the intensity is less than the threshold intensity.

Figure 8:
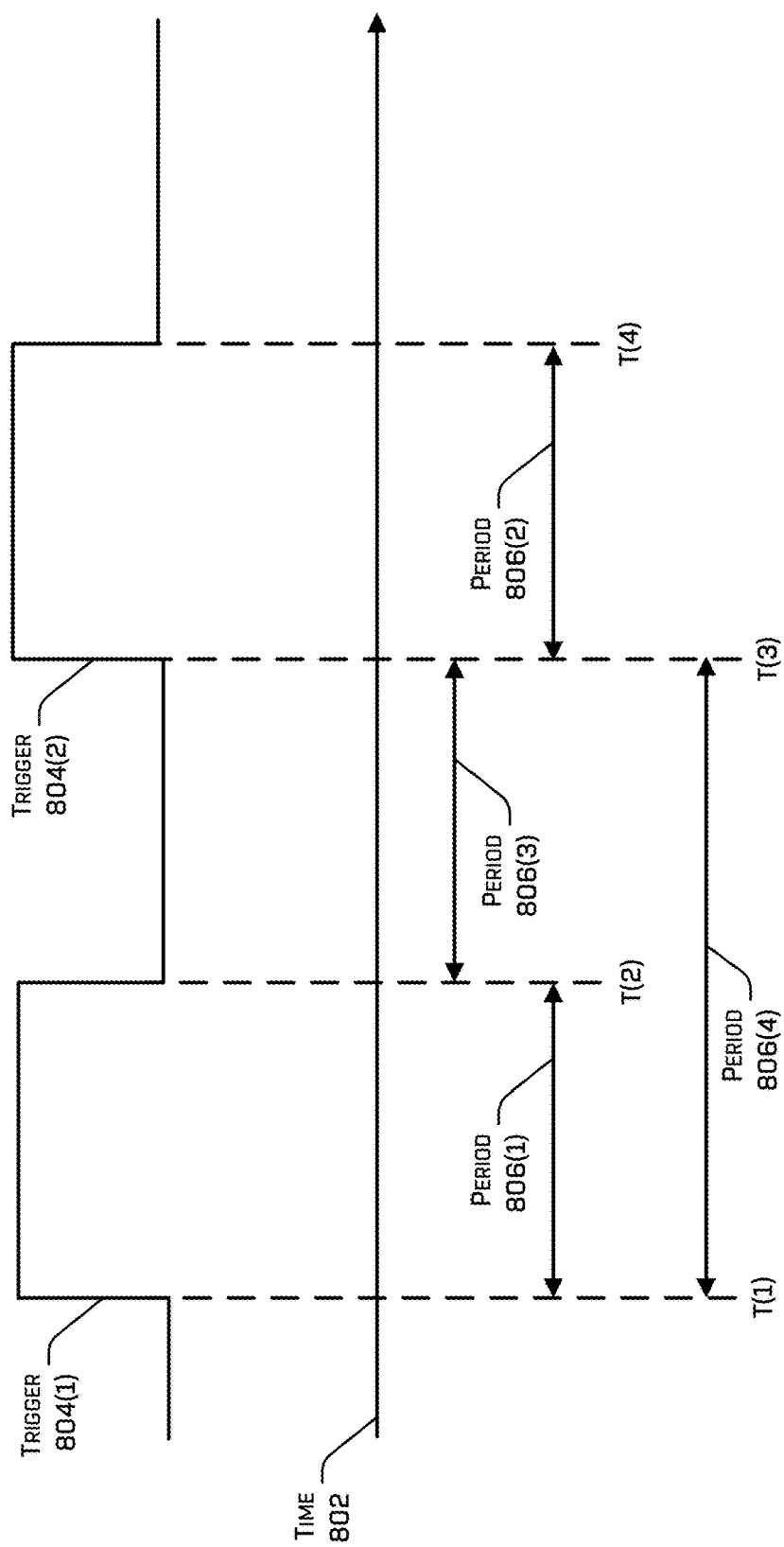
FIG. 8 illustrates an example of generating sensor data representing light at specific time periods.

FIG. 8 illustrates an example of generating sensor data representing light over a period of time 802. For instance, the sensor may be configured to generate sensor data (referred to, in this example, as "first sensor data") at various time periods for normal operation of the vehicle, such as for vehicle navigation, object detection, object avoidance, and/or to perform additional actions described herein. In the example of FIG. 8, the vehicle may trigger 804(1) the sensor to generate first sensor data at a first time T(1), where the sensor then generates the first sensor data during a time period 806(1) that is between the first time T(1) and a second time T(2). Additionally, the vehicle may trigger 804(2) the sensor to generate first sensor data at a third time T(3), where the sensor then generates the first sensor data during a time period 806(2) that is between the third time T(3) and a fourth time T(4). The vehicle may continue to perform these processes as the time 802 elapses.

As discussed above, the vehicle may not want to cause the light source to emit light when the sensor is generating this first sensor data in order to avoid the light from interfering with the normal operation of the sensor. As such, the vehicle may cause the light source to emit the light a time period 806(3) at which the sensor is not generating the first sensor data. Additionally, the vehicle may cause the sensor to generate sensor data (referred to, in this example, as "second sensor data") during this time period 806(3), where the vehicle may not use the second sensor data for normal operation of the vehicle. Rather, the vehicle may use the second sensor data to determine whether the sensor is obstructed, using one or more of the processes described herein.

In the example of FIG. 8, a time period 806(4) between the trigger 804(1) and the trigger 804(2) may include, but is not limited to, 10 milliseconds, 25 milliseconds, 50 milliseconds, 100 milliseconds, and/or any other time period. Additionally, the time period 806(1) and/or the time period 806(2) for generating the first sensor data may include, but is not limited to, 5 milliseconds, 12 milliseconds, 25 milliseconds, 50 milliseconds, and/or any other time period. As such, the time period 806(3) for generating the second sensor data may include the difference between the time period 806(4) and the time period 806(1), which is represented by the time 802 between the second time T(2) and the third time T(3).

Figure 9:
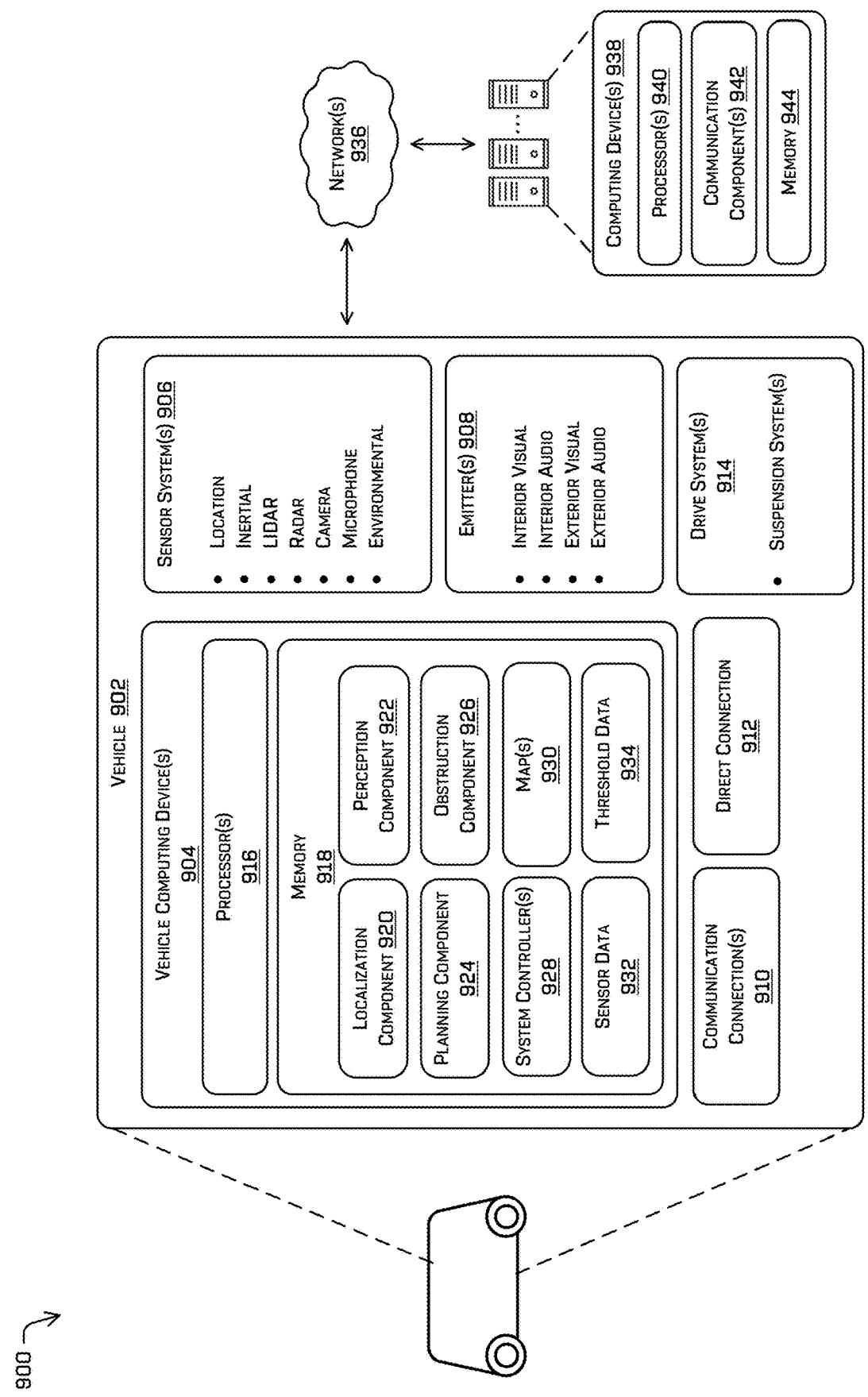
FIG. 9 depicts a block diagram of an example system for implementing the techniques described herein.

FIG. 9 depicts a block diagram of an example system 900 for implementing the techniques described herein, in accordance with embodiments of the disclosure. In at least one example, the system 900 can include the vehicle 902. The vehicle 902 can include a vehicle computing device 904, one or more sensor systems 906, one or more emitters 908, one or more communication connections 910, at least one direct connection 912, and one or more drive assemblies 914.

The vehicle computing device 904 can include one or more processors 916 and a memory 918 communicatively coupled with the processor(s) 916. In the illustrated example, the vehicle 902 is an autonomous vehicle. However, the vehicle 902 may be any other type of vehicle (e.g., a manually driven vehicle, a semi-autonomous vehicle, etc.), or any other system having at least an image capture device. In the illustrated example, the memory 918 of the vehicle computing device 904 stores a localization component 920, a perception component 922, a planning component 924, an obstruction component 926, one or more system controllers 928, and one or more maps 930. Though depicted in FIG. 9 as residing in the memory 918 for illustrative purposes, it is contemplated that the localization component 920, the perception component 922, the planning component 924, the obstruction component 926, the system controller(s) 928, and/or the map(s) 930 can additionally, or alternatively, be accessible to the vehicle 902 (e.g., stored on, or otherwise accessible by, memory remote from the vehicle 902).

In at least one example, the localization component 920 can include functionality to receive sensor data 932 from the sensor system(s) 906 and to determine a position and/or orientation of the vehicle 902 (e.g., one or more of an x-, y-, z-position, roll, pitch, or yaw). For example, the localization component 920 can include and/or request/receive a map of an environment and can continuously determine a location and/or orientation of the vehicle 902 within the map. In some instances, the localization component 920 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 902. In some instances, the localization component 920 can provide data to various components of the vehicle 902 to determine an initial position of the vehicle 902 for generating a candidate trajectory, as discussed herein.

In some instances, the perception component 922 can include functionality to perform object detection, segmentation, and/or classification. In some instances, the perception component 922 can provide processed sensor data 932 that indicates a presence of an object that is proximate to the vehicle 902 and/or a classification of the object as an object type (e.g., car, pedestrian, cyclist, animal, building, tree, road surface, curb, sidewalk, unknown, etc.). In additional and/or alternative examples, the perception component 922 can provide processed sensor data 932 that indicates one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 924 can determine a path for the vehicle 902 to follow to traverse through an environment. For example, the planning component 924 can determine various routes and trajectories and various levels of detail. For example, the planning component 924 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 924 can generate an instruction for guiding the vehicle 902 along at least a portion of the route from the first location to the second location. In at least one example, the planning component 924 can determine how to guide the vehicle 902 from a first waypoint in the sequence of waypoints to a second waypoint in the sequence of waypoints. In some instances, the instruction can be a trajectory, or a portion of a trajectory. In some instances, multiple trajectories can be substantially simultaneously generated (e.g., within technical tolerances) in accordance with a receding horizon technique, wherein one of the multiple trajectories is selected for the vehicle 902 to navigate.

In at least one example, the planning component 924 can determine a pickup location associated with a location. As used herein, a pickup location can be a specific location (e.g., a parking space, a loading zone, a portion of a ground surface, etc.) within a threshold distance of a location (e.g., an address or location associated with a dispatch request) where the vehicle 902 can stop to pick up a passenger. In at least one example, the planning component 924 can determine a pickup location based at least in part on determining a user identity (e.g., determined via image recognition or received as an indication from a user device, as discussed herein). Arrival at a pickup location, arrival at a destination location, entry of the vehicle by a passenger, and receipt of a "start ride" command are additional examples of events that may be used for event-based data logging.

The obstruction component 926 may be configured to perform the processes described herein in order to determine whether one or more of the sensors from the sensor system(s) 906 are obstructed. For example, the obstruction component 926 may receive sensor data 932 generated by a sensor, where the sensor data 932 represents at least a portion of light emitted by a light source of the sensor. The obstruction component 926 may then analyze the sensor data 932 in order to determine characteristic(s) associated with the at least the portion of the light. As described herein, a characteristic may include, but is not limited to, an area of illumination, an intensity, a location, a color, and/or a distribution associated with the at least the portion of the light. The obstruction component 926 may then use the characteristic(s) to determine whether the sensor is obstructed.

For instance, the obstruction component 926 may compare the characteristic(s) to threshold(s), where the threshold(s) are represented by threshold data 934. For example, the obstruction component 926 may compare the area of illumination to a threshold area, the intensity to a threshold intensity, the location to a threshold location, and/or the color to a threshold color. Based on the comparison(s), the obstruction component 926 may determine whether the sensor is obstructed. For example, the vehicle may determine that the sensor is obstructed when the characteristic satisfies the threshold and determine that the sensor is not obstructed when the characteristic does not satisfy the threshold. In some examples, the obstruction component 926 may determine that the characteristic satisfies the threshold when the characteristic is equal to or greater than the threshold and determine that the characteristic is not satisfied when the characteristic is less than the threshold. In other examples, the vehicle 902 may determine that the characteristic satisfies the threshold when the characteristic is less than the threshold and determine that the characteristic is not satisfied when the characteristic is equal to or greater than the threshold.

In some examples, the obstruction component 926 may determine a level of the obstruction using at least the characteristic. For instance, the obstruction component 926 may determine that there is a first level of obstruction when the characteristic is within a first range (e.g., a first range of areas, a first range of intensities, etc.), a second level of obstruction when the characteristic is within a second range (e.g., a second range of areas, a second range of intensities, etc.), a third level of obstruction when the characteristic is within a third range (e.g., a third range of areas, a third range of intensities, etc.), and/or so forth. For example, the first range of intensities may be between 50 lumens and 100 lumens, the second range of intensities may be between 100 lumens and 150 lumens, and third range of intensities may be between 150 lumens and 200 lumens, and/or so forth. While this is just one example of ranges that the obstruction component 926 may use to determine the level of the obstruction, in other examples, the obstruction component 926 may use additional and/or alternative ranges.

Additionally, or alternatively, in some examples, the obstruction component 926 may determine the type of obstruction using at least the characteristic. For example, the obstruction component 926 may determine that the type of obstruction includes a first substance (e.g., snow) when the characteristic is within a first range (e.g., a first range of intensities), a second substance (e.g., water) when the characteristic is within a second range (e.g., a second range of intensities), a third substance (e.g., mud) when the characteristic is within a third range (e.g., a third range of intensities), and/or so forth. For example, the first range of intensities may be between 50 lumens and 100 lumens, the second range of intensities may be between 100 lumens and 150 lumens, and third range of intensities may be between 150 lumens and 200 lumens, and/or so forth. While this is just one example of ranges that the obstruction component 926 may use to determine the type of obstruction, in other examples, the obstruction component 926 may use additional and/or alternative ranges.

In at least one example, the vehicle computing device 904 can include the system controller(s) 928, which can be configured to control steering, propulsion, braking, safety, emitters, communication, and other systems of the vehicle 902. These system controller(s) 928 can communicate with and/or control corresponding systems of the drive assembly(s) 914 and/or other components of the vehicle 902.

The memory 918 can further include the map(s) 930 that can be used by the vehicle 902 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the map(s) 930 can include at least one map (e.g., images and/or a mesh). In some example, the vehicle 902 can be controlled based at least in part on the map(s) 930. That is, the map(s) 930 can be used in connection with the localization component 920, the perception component 922, and/or the planning component 924 to determine a location of the vehicle 902, identify entities in an environment, and/or generate routes and/or trajectories to navigate within an environment.

In some instances, aspects of some or all of the components discussed herein can include any models, algorithms, and/or machine learning algorithms. For example, in some instances, the components in the memory 918 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based at least in part on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 2 (ID2), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

As discussed above, in at least one example, the sensor system(s) 906 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 906 can include multiple instances of each of these or other types of sensors. For instance, the lidar sensors can include individual lidar sensors located at the corners, front, back, sides, and/or top of the vehicle 902. As another example, the camera sensors can include multiple cameras disposed at various locations about the exterior and/or interior of the vehicle 902. The sensor system(s) 906 can provide input to the vehicle computing device 904. Additionally or alternatively, the sensor system(s) 906 can send the sensor data 932, via the one or more network(s) 936, to a computing device(s) 938 at a particular frequency, after a lapse of a predetermined period of time, upon occurrence of one or more conditions, in near real-time, etc.

The vehicle 902 can also include the emitter(s) 908 for emitting light and/or sound, as described above. The emitter(s) 908 in this example include interior audio and visual emitters to communicate with passengers of the vehicle 902. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 908 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 902 can also include the communication connections(s) 910 that enable communication between the vehicle 902 and one or more other local or remote computing device(s). For instance, the communication connection(s) 910 can facilitate communication with other local computing device(s) on the vehicle 902 and/or the drive assembly(s) 914. Also, the communication connection(s) 910 can allow the vehicle 902 to communicate with other nearby computing device(s) (e.g., other nearby vehicles, traffic signals, etc.). The communications connection(s) 910 also enable the vehicle 902 to communicate with the remote teleoperations computing devices or other remote services.

The communications connection(s) 910 can include physical and/or logical interfaces for connecting the vehicle computing device 904 to another computing device or a network, such as network(s) 936. For example, the communications connection(s) 910 can enable Wi-Fi-based communication such as via frequencies defined by the IEEE 802.11 standards, short range wireless frequencies such as Bluetooth®, cellular communication (e.g., 2 G, 2 G, 4 G, 4 G LTE, 5 G, etc.) or any suitable wired or wireless communications protocol that enables the respective computing device to interface with the other computing device(s).

In at least one example, the vehicle 902 can include one or more drive assemblies 914. In some instances, the vehicle 902 can have a single drive assembly 914. In at least one example, if the vehicle 902 has multiple drive assemblies 914, individual drive assemblies 914 can be positioned on opposite ends of the vehicle 902 (e.g., the front and the rear, etc.). In at least one example, the drive assembly(s) 914 can include one or more sensor systems to detect conditions of the drive assembly(s) 914 and/or the surroundings of the vehicle 902. By way of example and not limitation, the sensor system(s) 906 can include one or more wheel encoders (e.g., rotary encoders) to sense rotation of the wheels of the drive assemblies, inertial sensors (e.g., inertial measurement units, accelerometers, gyroscopes, magnetometers, etc.) to measure orientation and acceleration of the drive assembly(s), cameras or other image sensors, ultrasonic sensors to acoustically detect entities in the surroundings of the drive assembly(s), lidar sensors, radar sensors, etc. Some sensors, such as the wheel encoders can be unique to the drive assembly(s) 914. In some cases, the sensor system(s) 906 on the drive assembly(s) 914 can overlap or supplement corresponding systems of the vehicle 902 (e.g., sensor system(s) 906).

The drive assembly(s) 914 can include many of the vehicle systems, including a high voltage battery, a motor to propel the vehicle 902, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 914 can include a drive assembly controller which can receive and preprocess the sensor data 932 from the sensor system(s) 906 and to control operation of the various vehicle systems. In some instances, the drive assembly controller can include one or more processors and memory communicatively coupled with the one or more processors. The memory can store instructions to perform various functionalities of the drive assembly(s) 914. Furthermore, the drive assembly(s) 914 also include one or more communication connection(s) that enable communication by the respective drive assembly with one or more other local or remote computing device(s).

In at least one example, the direct connection 912 can provide a physical interface to couple the one or more drive assembly(s) 914 with the body of the vehicle 902. For example, the direct connection 912 can allow the transfer of energy, fluids, air, data, etc. between the drive assembly(s) 914 and the vehicle 902. In some instances, the direct connection 912 can further releasably secure the drive assembly(s) 914 to the body of the vehicle 902.

As further illustrated in FIG. 9, the computing device(s) 938 can include processor(s) 940, communication connection(s) 942, and memory 944. The processor(s) 916 of the vehicle 902 and/or the processor(s) 940 of the computing device(s) 938 (and/or other processor(s) described herein) can be any suitable processor capable of executing instructions to process data and perform operations as described herein. By way of example and not limitation, the processor(s) 916 and the processor(s) 940 can comprise one or more Central Processing Units (CPUs), Graphics Processing Units (GPUs), or any other device or portion of a device that processes electronic data to transform that electronic data into other electronic data that can be stored in registers and/or memory. In some instances, integrated circuits (e.g., ASICs, etc.), gate arrays (e.g., FPGAs, etc.), and other hardware devices can also be considered processors in so far as they are configured to implement encoded instructions.

The memory 918 and the memory 944 (and/or other memory described herein) are examples of non-transitory computer-readable media. The memory 918 and the memory 944 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 9 is illustrated as a distributed system, in alternative examples, components of the computing device(s) 938 can be associated with the vehicle 902. That is, the vehicle 902 can perform one or more of the functions associated with the computing device(s) 938 and/or the computing device(s) 938 can perform one or more of the functions associated with the vehicle 902. For example, the computing device(s) 938 may store the obstruction component 926, receive the sensor data 932 from the vehicle 902, and then use the obstruction component 926 to determine whether sensor(s) of the vehicle 902 are obstructed, using similar processes as those described above with regard to the vehicle 902.

Figure 10:
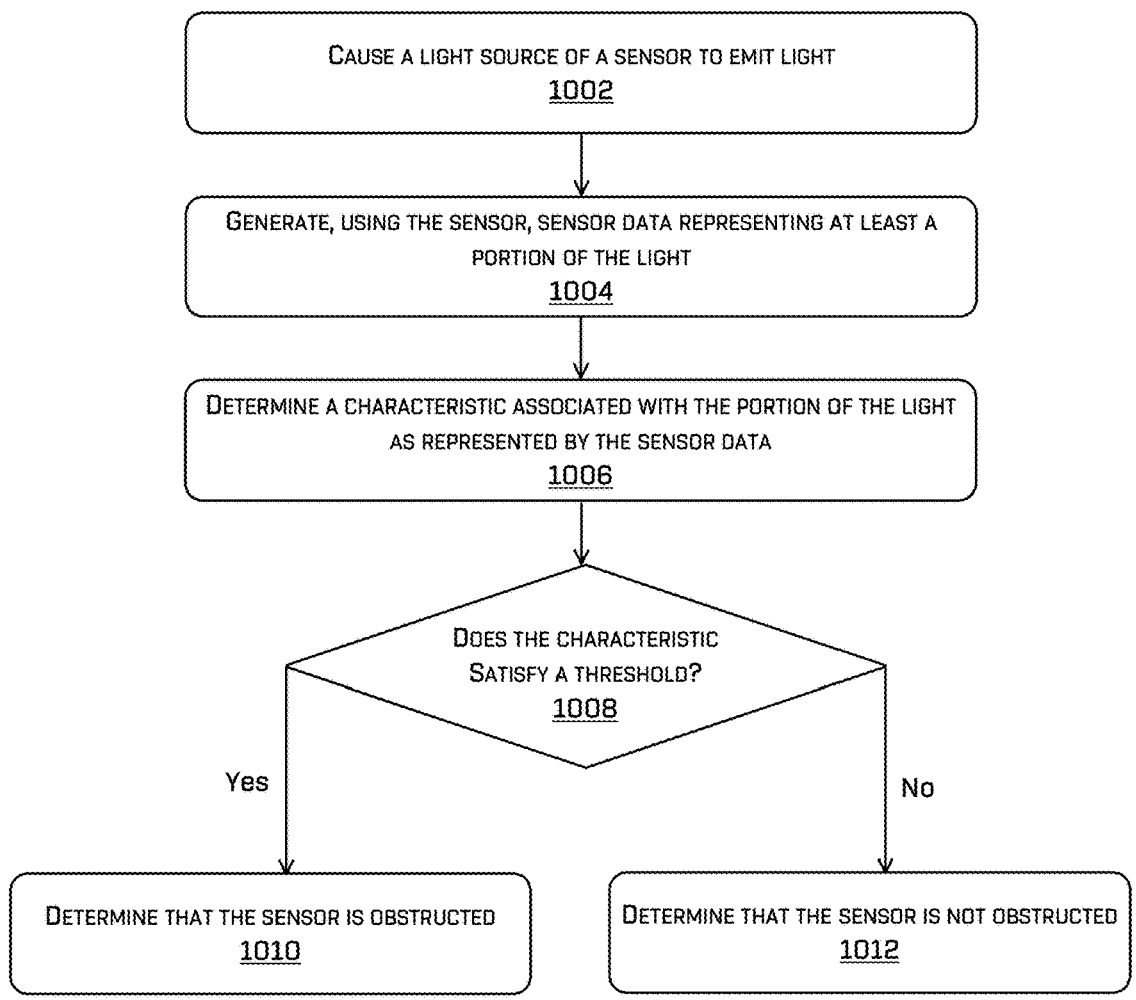
FIG. 10 illustrates a flow diagram of an example process for using a light source of a sensor in order to determine whether the sensor is obstructed.
Figure 11:
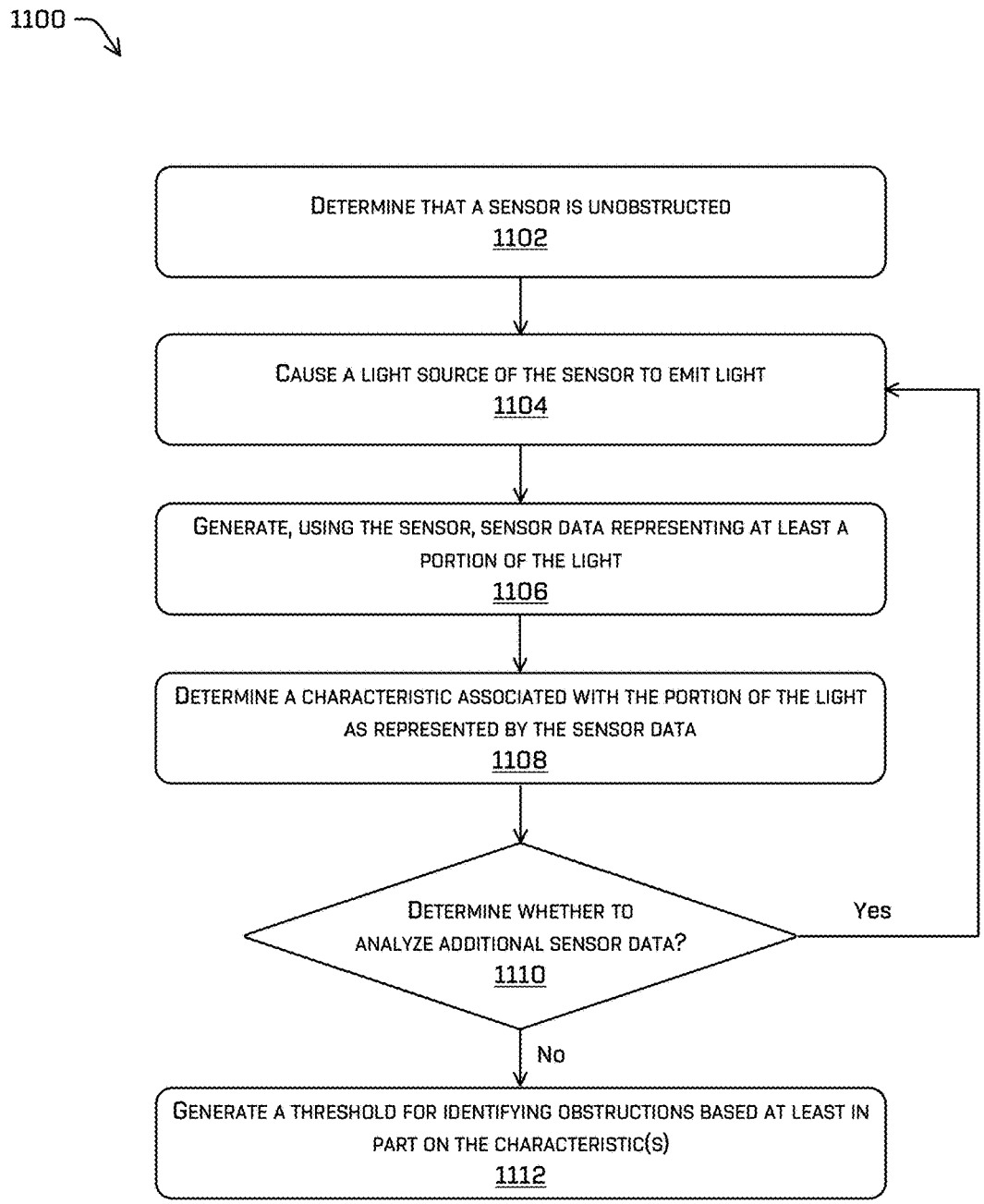
FIG. 11 illustrates a flow diagram of an example process for generating a threshold for identifying an obstruction on a sensor.

FIGS. 10 and 11 illustrate example processes in accordance with the disclosure. These processes are illustrated as logical flow graphs, each operation of which represents a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted or combined in any order and/or in parallel to implement the processes.

FIG. 10 illustrates a flow diagram of an example process 1000 for using a light source of a sensor in order to determine whether the sensor is obstructed. At operation 1002, the process 1000 may include causing a light source of a sensor to emit light. For instance, the vehicle 902 may cause the light source of the sensor to emit the light. In some examples, the vehicle 902 causes the light source to emit the light at specific time periods. For example, the vehicle 902 may use the light source to generate, at first time periods, additional sensor data that the vehicle uses for normal operation of the vehicle 902, such as for vehicle navigation, object detection, and object avoidance as the vehicle navigates through an environment. As such, the vehicle 902 may cause the light source to emit the light between these specific time periods. However, in other examples, such as when the light source includes an infrared light source, the vehicle 902 may cause the light source to emit the light even during these specific time periods.

At operation 1004, the process 1000 may include generating, using the sensor, sensor data representing at least a portion of the light. For instance, the vehicle 902 may use a component of the sensor, such as an image sensor or a light sensor, to generate the sensor data representing the at least the portion of the light. In some examples, the at least the portion of the light is reflected off of a lens, a window, and/or a substance (e.g., an obstruction) and back to the component of the sensor. As such, a greater portion of the light may be reflected back towards the component when the sensor is obstructed. However, in other examples, the at least the portion of the light is transmitted through the lens, the window, and/or the substance and towards the component. As such, a greater portion of the light may be transmitted to the component when the sensor is not obstructed.

At operation 1006, the process 1000 may include determining a characteristic associated with the at least the portion of the light as represented by the sensor data. For instance, the vehicle 902 may analyze the sensor data in order to determine the characteristic associated with the at least the portion of the light. As described herein, the characteristic may include, but is not limited to, an area of illumination, an intensity, a location, a color, and/or any other light characteristic associated with the at least the portion of the light. In some examples, such as when the vehicle 902 continues to generate sensor data representing light emitted by the light source, the vehicle 902 may determine a minimum, an average, a maximum, a range, and/or the like of the characteristic associated with the light being emitted by the light source.

At operation 1008, the process 1000 may include determining whether the characteristic satisfies a threshold. For instance, the vehicle 902 may then compare the characteristic to the threshold in order to determine whether the characteristic satisfies the threshold. For example, the vehicle 902 may determine whether the area of illumination satisfies a threshold area, the intensity satisfies a threshold intensity, the location satisfies a threshold location, and/or the color satisfies a threshold color. In some examples, and as described with respect to the example process 1100, the vehicle 902 may determine the threshold using a previous test of the sensor. Additionally, or alternatively, in some examples, the threshold may include a baseline threshold for sensors that are similar to the sensor.

In some examples, such as when the light is reflected off of the lens, the window, and/or the obstruction, the vehicle 902 may determine that the characteristic satisfies the threshold when the characteristic is equal to or greater than the threshold. In other examples, such as when the light source emits the light directly through the lens, the vehicle 902 may determine that the characteristic is satisfied when the characteristic is less than the threshold. Additionally, in examples where the vehicle 902 determines that the characteristic satisfies the threshold, the vehicle 902 may additionally analyze the characteristic to determine a level of obstruction and/or a type of substance associated with the obstruction.

If, at operation 1008, it is determined that the characteristic satisfies the threshold, then at operation 1010, the process 1000 may include determining that the sensor is obstructed. For instance, if the vehicle 902 determines that the characteristic is satisfied, then the vehicle 902 may determine that the sensor is obstructed. In some examples, the vehicle 902 may then perform one or more first actions. The one or more first actions may include, but are not limited to, continuing to operate, safely stopping, slowing down, retesting the sensor to determine whether the sensor remains obstructed, generating data representing the results of the test, and/or the like. In some examples, the vehicle 902 may determine the one or more first actions based on the level of obstruction and/or the type of substance.

However, if, at operation 1008, it is determined that the characteristic does not satisfy the threshold, then at operation 1012, the process 1000 may include determining that the sensor is not obstructed. For instance, if the vehicle 902 determines that the characteristic is not satisfied, then the vehicle 902 may determine that the sensor is not obstructed. In some examples, the vehicle 902 may then perform one or more second actions. The one or more second actions may include, but are not limited to, continuing to operate, generating data representing the results of the test (e.g., the characteristic), and/or the like.

FIG. 11 is a flow diagram illustrating an example process 1100 of an example process for generating a threshold for identifying an obstruction on a sensor. At operation 1102, the process 1100 may include determining that a sensor is unobstructed. For instance, the vehicle 902 may determine that the sensor of the vehicle 902 is unobstructed. In some examples, the vehicle 902 makes the determination based on receiving data indicating that the sensor is unobstructed (e.g., a user may input into a system that the sensor is unobstructed). Additionally, or alternatively, in some examples, the vehicle 902 makes the determination based on performing the process 1000 of FIG. 10.

At operation 1104, the process 1100 may include causing a light source of the sensor to emit light and at 1106, the process 1100 may include generating, using the sensor, sensor data representing at least a portion of the light. For instance, the vehicle 902 may cause the light source of the sensor to emit the light. The vehicle 902 may then use a component of the sensor, such as an image sensor or a light sensor, to generate the sensor data representing the at least the portion of the light. In some examples, the at least the portion of the light is reflected off of a lens and/or a window of the sensor and back to the component of the sensor. In other examples, the at least the portion of the light is transmitted through the lens and/or the window of the sensor and towards the component.

At operation 1108, the process 1100 may include determining a characteristic associated with the at least the portion of the light as represented by the sensor data. For instance, the vehicle 902 may analyze the sensor data in order to determine the characteristic associated with the at least the portion of the light. As described herein, the characteristic may include, but is not limited to, an area of illumination, an intensity, a location, a color, and/or any other light characteristic associated with the at least the portion of the light.

At operation 1110, the process 1100 may include determining whether to analyze additional sensor data. For instance, the vehicle 902 may determine whether to analyze additional sensor data in order to determine additional characteristic(s) associated with light emitted by the light source. If, at operation 1110, it is determined to analyze additional sensor data, then the process 1100 may repeat starting back at 1104 in order to determine the additional characteristic(s). For instance, if the vehicle 902 determines to analyze the additional sensor data, then the vehicle 902 may continue to cause the light source to emit the additional light, generate the additional sensor data using the sensor, and determine the additional characteristic(s) using the additional sensor data.

However, it, at operation 1110, it is determined not to analyze the additional sensor data, then at operation 1112, the process 1100 may include generating a threshold for identifying obstructions based at least in part on the characteristic(s). For instance, if the vehicle 902 determines not to analyze the additional sensor data, then the vehicle 902 may determine the threshold based at least in part on the characteristic(s). In some examples, the vehicle 902 may determine the threshold as the minimum, the average, the maximum, a range, and/or the like associated with the characteristic(s).

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

EXAMPLE CLAUSES

A: A vehicle comprising: a camera that includes a light-emitting diode (LED) and an image sensor; one or more processors; and one or more computer-readable media storing instructions that, when executed by the one or more processors, cause the one or more processors to perform operations comprising: causing the LED to emit light; receiving sensor data generated by the camera, the sensor data representing a portion of the light reflected internally off of a surface of the camera; analyzing the sensor data to determine a characteristic associated with the portion of the light; determining that the characteristic satisfies a threshold; and determining that the camera is obstructed based at least in part on the characteristic satisfying the threshold.

B: The vehicle as recited in paragraph A, wherein the characteristic includes an intensity of the portion of the light as represented by the sensor data, and wherein determining that the characteristic satisfies the threshold comprises determining that the intensity is equal to or greater than a threshold intensity.

C: The vehicle as recited in either paragraph A or paragraph B, wherein the characteristic includes an area of illumination of the portion of the light as represented by the sensor data, and wherein determining that the characteristic satisfies the threshold comprises determining that the area of illumination is equal to or greater than a threshold area.

D: The vehicle as recited in any one of paragraphs A-C, wherein causing the LED to emit the light occurs at a first time, and wherein the operations further comprise: causing, at a second time prior to the first time and when the camera is known to be unobstructed, the LED to emit additional light; receiving additional sensor data generated by the camera, the additional sensor data representing a portion of the additional light; and analyzing the additional sensor data to determine an additional characteristic associated with the portion of the additional light, wherein determining the characteristic satisfied the threshold is based at least in part on the additional characteristic.

E: The vehicle as recited in any one of paragraphs A-D, further comprising a light sensor, and wherein receiving the sensor data generated by the camera comprises receiving the sensor data generated by the light sensor.

F: A method comprising: causing a light emitter housed within a camera to emit light, the camera including at least an image sensor and the light emitter; receiving, as sensor data, a response of a reflection of the light from an internal surface of the camera; determining, based at least in part on the sensor data, a characteristic associated with the internal surface; and determining whether the sensor is obstructed based at least in part on the characteristic.

G: The method as recited in paragraph F, wherein: the characteristic includes an intensity of the portion of the light as represented by the sensor data, and determining whether the camera is obstructed comprises determining that the camera is obstructed based at least in part on the intensity satisfying a threshold intensity.

H: The method as recited in either paragraph F or paragraph G, wherein the characteristic includes an area of illumination of the portion of the light as represented by the sensor data, and wherein the method further comprises: determining that the area of illumination satisfies a threshold area, wherein determining whether the camera is obstructed comprises determining that the camera is obstructed based at least in part on the area of illumination satisfying the threshold area.

I: The method as recited in any one of paragraphs F-H, wherein causing the light emitter to emit the light occurs at a first time, and wherein the method further comprises: causing, at a second time that is prior to the first time, the LED to emit additional light; receiving, as additional sensor data, an additional response of a reflection of the additional light from the internal surface of the camera; and determining, based at least in part on the additional sensor data, an additional characteristic associated with the internal surface, wherein determining whether the camera is obstructed is further based at least in part on the additional characteristic.

J: The method as recited in any one of paragraphs F-I, further comprising: determining a threshold based at least in part on the additional characteristic; and determining that the characteristic satisfies the threshold, wherein determining whether the camera is obstructed comprises determining that the camera is obstructed based at least in part on the characteristic satisfying the threshold.

K: The method as recited in any one of paragraphs F-J, wherein the sensor data is first sensor data, and wherein the method further comprises: generating, using the camera, second sensor data; analyzing the second sensor data to determine that the second sensor data represents a first object; generating, using the camera and based at least in part on elapse of a period of time after generating the second sensor data, third sensor data; and analyzing the third sensor data to determine that the third sensor data represents a second object, wherein causing the LED to emit the light occurs during the period of time.

L: The method as recited in any one of paragraphs F-K, further comprising determining a type of obstruction based at least in part on the characteristic.

M: The method as recited in any one of paragraphs F-L, wherein the camera includes a light sensor, and wherein receiving the sensor data comprises receiving the sensor data from the light sensor.

N: The method as recited in any one of paragraphs F-M, wherein the camera includes a housing, and wherein the light source is disposed proximate to an image sensor within the housing.

O: The method as recited in any one of paragraphs F-N, wherein the camera includes a housing with at least a baffle, and wherein the light source is disposed proximate to the baffle.

P: A vehicle comprising: an imaging device that includes; a first light source; a second light source; a first light sensor; and a second light sensor; one or more processors; and one or more computer-readable media storing instructions that, when executed by the one or more processors, cause the one or more processors to perform operations comprising: causing the first light source to emit light; receiving, as sensor data generated by the first light sensor, a response of a reflection of the light from an internal surface of the imaging device; determining, based at least in part on the sensor data, a characteristic associated with the internal surface; and determining whether the imaging device is obstructed based at least in part on the characteristic.

Q: The vehicle as recited in paragraph P, wherein the characteristic includes an intensity of the portion of the light as represented by the sensor data, and wherein the operations further comprise: determining that the intensity satisfies a threshold intensity, wherein determining whether the imaging device is obstructed comprises determining that the imaging device is obstructed based at least in part on the intensity satisfying the threshold intensity.

R: The vehicle as recited in either paragraph P or paragraph Q, wherein the characteristic includes an area of illumination of the portion of the light as represented by the sensor data, and wherein the operations further comprise: determining that the area of illumination satisfies a threshold area, wherein determining whether the imaging device is obstructed comprises determining that the imaging device is obstructed based at least in part on the area of illumination satisfying the threshold area.

S: The vehicle as recited in any one of paragraphs P-R, wherein causing the first light source to emit the light occurs at a first time, and wherein the operations further comprise: causing, at a second time, the first light source to emit additional light; receiving, as additional sensor data generated by the first light sensor, an additional response of a reflection of the additional light from the internal surface of the imaging device; determining, based at least in part on the additional sensor data, an additional characteristic associated with the internal surface, wherein determining whether the imaging device is obstructed is further based at least in part on the additional characteristic.

T: The vehicle as recited in any one of paragraphs P-S, wherein: the imaging device comprise a lidar sensor; the first light source comprises a light-emitting diode (LED); the second light source comprises a laser; the first light sensor comprises a photodiode; and the second light sensor comprises a lidar sensor.

What is claimed is:
1. A vehicle comprising:
a camera that includes an optical axis extending through a housing of the camera from a first end having an aperture through which light is received from an outside environment to a second end at which an image sensor is disposed, the camera including a light-emitting diode (LED) proximate the first end of the camera, and a light sensor proximate the second end of the camera opposite the first end of the camera;
one or more processors; and
one or more computer-readable media storing instructions that, when executed by the one or more processors, cause the one or more processors to perform operations comprising:
causing the LED to emit light at least in a direction towards the light sensor and through a lens;

receiving sensor data generated by the light sensor, the sensor data representing a portion of the light reflected internally off of a surface of the camera;

analyzing the sensor data to determine a characteristic associated with the portion of the light;

determining that the characteristic satisfies a threshold; and determining that the camera is obstructed based at least in part on the characteristic satisfying the threshold.

2. The vehicle as recited in claim 1, wherein the characteristic includes an intensity of the portion of the light as represented by the sensor data, and wherein determining that the characteristic satisfies the threshold comprises determining that the intensity is equal to or greater than a threshold intensity.

3. The vehicle as recited in claim 1, wherein the characteristic includes an area of illumination of the portion of the light as represented by the sensor data, and wherein determining that the characteristic satisfies the threshold comprises determining that the area of illumination is equal to or greater than a threshold area.

4. The vehicle as recited in claim 1, wherein causing the LED to emit the light occurs at a first time, and wherein the operations further comprise:

causing, at a second time prior to the first time and when the camera is known to be unobstructed, the LED to emit additional light;

receiving additional sensor data generated by the camera, the additional sensor data representing a portion of the additional light; and analyzing the additional sensor data to determine an additional characteristic associated with the portion of the additional light, wherein determining the characteristic satisfied the threshold is based at least in part on the additional characteristic.

5. The vehicle as recited in claim 1, wherein receiving the sensor data further comprises receiving the sensor data generated by the image sensor.

6. A method comprising:

causing a light emitter housed within a camera to emit light at least in a direction towards a light sensor and through a lens, the camera including at least an image sensor, the light emitter proximate a first end of the camera, and the light sensor proximate a second end of the camera different from the first end of the camera, wherein the first end of the camera comprises an aperture through which light is received from an outside environment and wherein the second end of the camera is opposite the first end along an optical axis associated with the image sensor;

receiving, as sensor data generated by the light sensor, a response of a reflection of the light from an internal surface of the camera;

determining, based at least in part on the sensor data, a characteristic associated with the internal surface; and determining whether the camera is obstructed based at least in part on the characteristic.

7. The method as recited in claim 6, wherein:

the characteristic includes an intensity of a portion of the reflection of the light as represented by the sensor data, and determining whether the camera is obstructed comprises determining that the camera is obstructed based at least in part on the intensity satisfying a threshold intensity.

8. The method as recited in claim 6, wherein the characteristic includes an area of illumination of a portion of the reflection of the light as represented by the sensor data, and wherein the method further comprises:

determining that the area of illumination satisfies a threshold area, wherein determining whether the camera is obstructed comprises determining that the camera is obstructed based at least in part on the area of illumination satisfying the threshold area.

9. The method as recited in claim 6, wherein causing the light emitter to emit the light occurs at a first time, and wherein the method further comprises:

causing, at a second time that is prior to the first time, the light emitter to emit additional light;

receiving, as additional sensor data, an additional response of a reflection of the additional light from the internal surface of the camera; and determining, based at least in part on the additional sensor data, an additional characteristic associated with the internal surface, wherein determining whether the camera is obstructed is further based at least in part on the additional characteristic.

10. The method as recited in claim 9, further comprising:

determining a threshold based at least in part on the additional characteristic; and determining that the characteristic satisfies the threshold, wherein determining whether the camera is obstructed comprises determining that the camera is obstructed based at least in part on the characteristic satisfying the threshold.

11. The method as recited in claim 6, wherein the sensor data is first sensor data, and wherein the method further comprises:

generating, using the camera, second sensor data;

analyzing the second sensor data to determine that the second sensor data represents a first object;

generating, using the camera and based at least in part on elapse of a period of time after generating the second sensor data, third sensor data; and analyzing the third sensor data to determine that the third sensor data represents a second object, wherein causing the light emitter to emit the light occurs during the period of time.

12. The method as recited in claim 6, further comprising determining a type of obstruction based at least in part on the characteristic.

13. The method as recited in claim 6, wherein receiving the sensor data further comprises receiving the sensor data from the image sensor.

14. The method as recited in claim 6, wherein the camera includes a housing, and wherein the light emitter is disposed proximate to the image sensor within the housing.

15. The method as recited in claim 6, wherein the camera includes a housing with at least a baffle, and wherein the light emitter is disposed proximate to the baffle.

16. The vehicle as recited in claim 1, wherein causing the LED to emit the light occurs at a first time, and wherein the operations further comprise:

causing, at a second time that is prior to the first time, the LED to emit additional light;

receiving additional sensor data generated by the camera, the additional sensor data representing an internal reflection of the additional light from the surface of the camera; and determining, based at least in part on the additional sensor data, an additional characteristic associated with the surface, wherein determining that the camera is obstructed is further based at least in part on the additional characteristic.

17. The vehicle as recited in claim 1, wherein the operations further comprise:
   determining, based at least in part on the characteristic, a type of obstruction of the camera.

18. The vehicle as recited in claim 1, wherein the sensor data is first sensor data, and wherein the operations further comprise:
   generating, using the camera, second sensor data;
   analyzing the second sensor data to determine that the second sensor data represents a first object;
   generating, using the camera and based at least in part on elapse of a period of time after generating the second sensor data, third sensor data; and
   analyzing the third sensor data to determine that the third sensor data represents a second object,
   wherein causing the LED to emit the light occurs during the period of time.

19. The method of claim 6, wherein:
   the camera comprises a lidar sensor;
   the light emitter comprises a light-emitting diode (LED); and
   the light sensor comprises a photodiode.

* * * * *